US012056993B2

(12) United States Patent
Patel et al.

(10) Patent No.: US 12,056,993 B2
(45) Date of Patent: *Aug. 6, 2024

(54) CONTROLLED DISPENSING SYSTEM AND METHOD

(71) Applicant: PAYRANGE INC., Portland, OR (US)

(72) Inventors: Paresh K. Patel, Portland, OR (US); Srinivas Annam, Portland, OR (US)

(73) Assignee: PAYRANGE INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,096

(22) Filed: May 23, 2023

(65) Prior Publication Data

US 2023/0298427 A1   Sep. 21, 2023

Related U.S. Application Data

(63) Continuation of application No. 17/469,776, filed on Sep. 8, 2021, now Pat. No. 11,657,667, which is a
(Continued)

(51) Int. Cl.
*G07F 9/00* (2006.01)
*G06F 21/31* (2013.01)
*G07F 11/72* (2006.01)

(52) U.S. Cl.
CPC ............ *G07F 9/002* (2020.05); *G06F 21/31* (2013.01); *G07F 9/001* (2020.05); *G07F 11/72* (2013.01)

(58) Field of Classification Search
CPC .......... G07F 9/002; G07F 11/72; G07F 9/001; G06F 21/31; G06Q 30/0607;
(Continued)

(56) References Cited

U.S. PATENT DOCUMENTS 6,711,465 B2 * 3/2004 Tomassi ................ G07C 9/257
700/236
7,783,379 B2   8/2010 Beane et al.
(Continued)

FOREIGN PATENT DOCUMENTS

WO   WO2019/126805 A1   6/2019
WO   WO2021/178007 A1   9/2021

OTHER PUBLICATIONS

Payrange, Inc., PCT/US2020/055456, International Search Report and Written Opinion, Feb. 2, 2021, 9 pgs.
(Continued)

*Primary Examiner* — Michael Collins
(74) *Attorney, Agent, or Firm* — Morgan, Lewis & Bockius LLP

(57) ABSTRACT

A controlled dispensing fixture including a display screen, a scanning device, and one or more processors is configured to: obtain via the display screen or remote scanner a selection of one or more controlled products; update a user interface on the display screen based on the selection; determine whether the one or more controlled products meet a purchase limit associated with the one or more controlled products for dispensing; obtain via the scanning device consumer identification information; determine whether the consumer identification information meets an age threshold and/or an identity requirement associated with the one or more controlled products; and in accordance with a determination that (i) the one or more controlled products meet the purchase limit for dispensing, and (ii) the consumer identification information meets the age threshold and/or the identity requirement, transmit a dispensing instruction to the dispensing fixture to dispense the one or more controlled products.

20 Claims, 25 Drawing Sheets

Related U.S. Application Data continuation of application No. 17/026,000, filed on Sep. 18, 2020, now Pat. No. 11,663,875.

(60) Provisional application No. 63/075,814, filed on Sep. 8, 2020, provisional application No. 62/985,882, filed on Mar. 5, 2020.

(58) Field of Classification Search
CPC ............... G06Q 20/322; G05B 19/042; G05B 2219/23363; G05B 2119/24033; A24F 40/65; A24F 40/53; G06K 7/1095; G06K 7/1413; B65G 1/1371
See application file for complete search history.

(56) References Cited

U.S. PATENT DOCUMENTS

| | | | |
|---|---|---|---|
| 9,466,082 B1 | 10/2016 | Dabiri | |
| 9,646,300 B1* | 5/2017 | Zhou | G06Q 20/3278 |
| 9,691,201 B2* | 6/2017 | Myers | G07C 9/20 |
| 9,904,911 B2 | 2/2018 | Bowles | |
| 10,171,444 B1* | 1/2019 | Lerner | H04L 63/08 |
| 10,395,246 B2* | 8/2019 | Li | G06Q 20/308 |
| 10,600,095 B2 | 3/2020 | Ackerman | |
| 11,200,770 B2 | 12/2021 | Hubbard et al. | |
| 11,321,962 B2* | 5/2022 | McClellan | G06V 40/173 |
| 11,334,931 B2 | 5/2022 | Ryner et al. | |
| 11,386,740 B2 | 7/2022 | Shah | |
| 11,537,352 B1 | 12/2022 | Clements | |
| 11,620,622 B2 | 4/2023 | Swaminathan | |
| 11,657,667 B2* | 5/2023 | Patel | G07F 9/002 700/231 |
| 11,663,875 B2 | 5/2023 | Patel et al. | |
| 11,783,395 B2 | 10/2023 | Hubbard et al. | |
| 2001/0026632 A1 | 10/2001 | Tamai | |
| 2005/0192705 A1 | 9/2005 | Pinney et al. | |
| 2007/0239549 A1 | 10/2007 | LaFauci et al. | |
| 2008/0269947 A1 | 10/2008 | Beane et al. | |
| 2009/0144208 A1 | 6/2009 | Blust et al. | |
| 2010/0234986 A1* | 9/2010 | Clopton | G06Q 10/087 709/201 |
| 2012/0310408 A1 | 12/2012 | Stache et al. | |
| 2014/0100691 A1* | 4/2014 | West | G07F 9/002 700/232 |
| 2015/0088731 A1 | 3/2015 | Ackerman | |
| 2015/0100441 A1 | 4/2015 | Alarcon et al. | |
| 2016/0019741 A1* | 1/2016 | Dua | G07F 9/002 700/241 |
| 2016/0098882 A1* | 4/2016 | Holdych | G06Q 20/327 700/237 |
| 2016/0106936 A1 | 4/2016 | Kimmel | |
| 2016/0155127 A1* | 6/2016 | Hartman | H04N 5/772 705/18 |
| 2016/0379287 A1 | 12/2016 | Dabiri | |
| 2017/0186110 A1 | 6/2017 | Carpenter et al. | |
| 2017/0302641 A1 | 10/2017 | Ramatchandirane et al. | |
| 2018/0262891 A1 | 9/2018 | Wu et al. | |
| 2018/0288594 A1 | 10/2018 | Kim | |
| 2019/0050921 A1 | 2/2019 | Ryner et al. | |
| 2019/0114685 A1 | 4/2019 | Postrel | |
| 2020/0137570 A1 | 4/2020 | Skoda | |
| 2020/0342507 A1 | 10/2020 | Hubbard et al. | |
| 2020/0401792 A1* | 12/2020 | McClellan | G06Q 20/40145 |
| 2021/0176240 A1 | 6/2021 | Rose | |
| 2021/0279994 A1 | 9/2021 | Patel et al. | |
| 2021/0327201 A1 | 10/2021 | Patel | |
| 2021/0327203 A1 | 10/2021 | Shah | |
| 2021/0403239 A1 | 12/2021 | Patel et al. | |
| 2021/0405602 A1 | 12/2021 | Patel et al. | |
| 2021/0406970 A1 | 12/2021 | Patel et al. | |
| 2021/0407243 A1 | 12/2021 | Patel et al. | |
| 2022/0051507 A1 | 2/2022 | Forutanpour et al. | |
| 2022/0071299 A1 | 3/2022 | Patel | |
| 2022/0245690 A1 | 8/2022 | Ryner et al. | |
| 2022/0398557 A1* | 12/2022 | Richards | G06Q 20/208 |
| 2023/0322487 A1 | 10/2023 | Patel | |
| 2024/0013606 A1* | 1/2024 | Smee | G07F 9/026 |

OTHER PUBLICATIONS

Payrange, Inc., PCT/US2020/055456, International Preliminary Report on Patentability, Sep. 6, 2022, 6 pgs.

Patel, Non-Final Office Action, U.S. Appl. No. 17/026,000, filed Sep. 29, 2022, 17 pgs.

Patel, Non-Final Office Action, U.S. Appl. No. 17/469,776, filed Sep. 29, 2022, 16 pgs.

Patel, Non-Final Office Action, U.S. Appl. No. 17/194,152, filed Mar. 10, 2023, 14 pgs.

Patel, Notice of Allowance, U.S. Appl. No. 17/026,000, filed Apr. 7, 2023, 8 pgs.

Patel, Notice of Allowance, U.S. Appl. No. 17/469,776, filed Apr. 10, 2023, 9 pgs.

Patel et al., Non-Final Office Action, U.S. Appl. No. 17/447,530, filed Apr. 13, 2023, 14 pgs.

Patel et al., Notice of Allowance, U.S. Appl. No. 17/447,530, filed Oct. 24, 2023, 9 pgs.

Patel et al., Non-Final Office Action, U.S. Appl. No. 17/447,528, filed May 11, 2023, 13 pgs.

Patel et al., Non-Final Office Action, U.S. Appl. No. 17/447,499, filed Apr. 12, 2023, 20 pgs.

Patel et al., Notice of Allowance, U.S. Appl. No. 17/447,499, filed Oct. 26, 2023, 9 pgs.

Patel, Notice of Allowance, U.S. Appl. No. 17/194,152, filed Nov. 15, 2023, 8 pgs.

Patel et al., Notice of Allowance, U.S. Appl. No. 17/447,528, filed Nov. 22, 2023, 8 pgs.

* cited by examiner

| Step | Device(s) | Association | |
|---|---|---|---|
| Account Setup | Device 106 / Server 108 | UserID < > MobileID | ⌐602 |
| Item Selection | Device 106 / Server 108 | UserID < > SelectID | ⌐604 |
| Item Identification | Machine 102 | UserID < > ItemID | ⌐606 |
| Item Activation | Server 108 | MobileID < > ItemID | ⌐608 |

Figure 6A

| Step | Device(s) | Association | |
|---|---|---|---|
| Account Setup | Device 106 / Server 108 | UserID < > MobileID | ⌐612 |
| Item Stocking | Machine 102 | ItemID < > SelectID | ⌐614 |
| Item Selection | Device 106 / Server 108 | UserID < > ItemID | ⌐616 |
| Item Activation | Server 108 | MobileID < > ItemID | ⌐618 |

Figure 6B

Dispensing Machine Row
1000
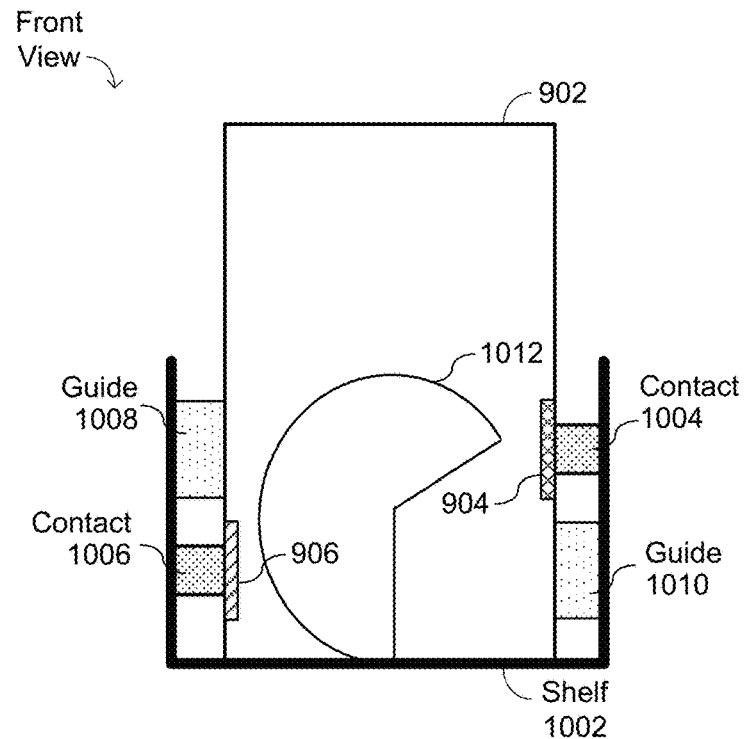
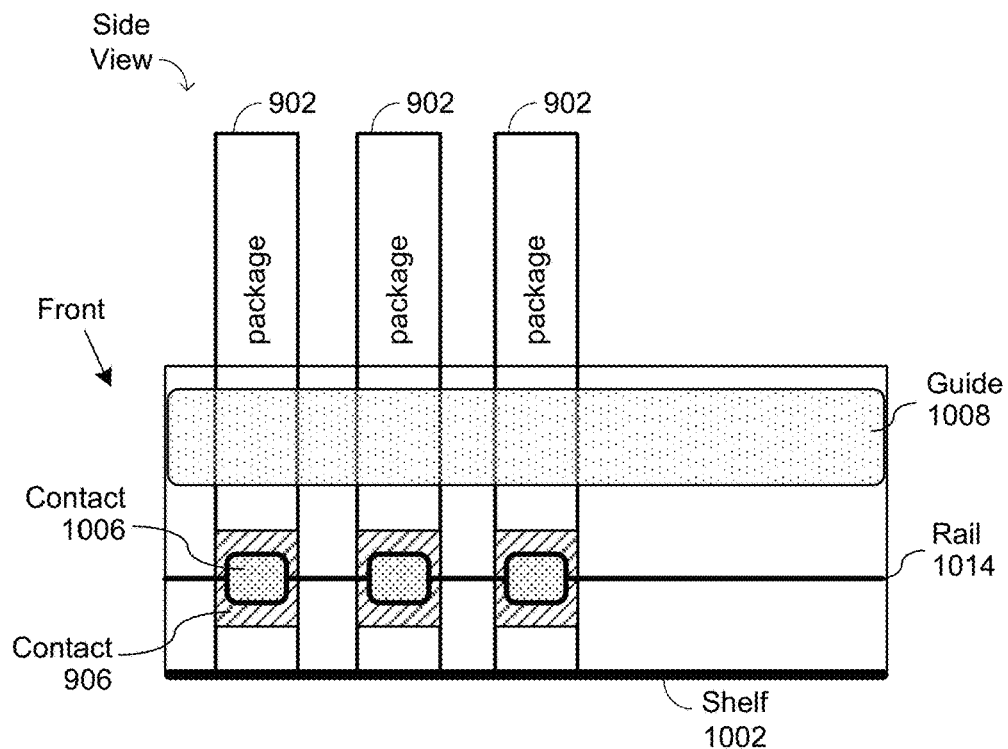
Figure 10

CONTROLLED DISPENSING SYSTEM AND METHOD

RELATED APPLICATIONS

The present application is a continuation of U.S. patent application Ser. No. 17/469,776, filed Sep. 8, 2021, which is a continuation of U.S. patent application Ser. No. 17/026,000, filed Sep. 18, 2020 and issued as U.S. Pat. No. 11,663,875 on May 30, 2023, which claims priority to U.S. Provisional Patent Application No. 62/985,882, filed Mar. 5, 2020, and U.S. Provisional Patent Application No. 63/075,814, filed Sep. 8, 2020, each of which is hereby incorporated by reference in its entirety.

FIELD OF THE INVENTION

The present application relates to the field of controlled dispensing machines, and in particular, to a system for restricting the purchase and use of controlled products to individuals who are authorized to use them.

BACKGROUND

Selling age-restricted products presents particular issues and there must be effective systems in place for preventing sales to prospective customers who are underage. Since young people often seek to discover ways to evade proof-of-age checks and obtain age-restricted products, sales of such products have traditionally required a live person at the point of sale to request valid proof of age to confirm that the purchaser is over the minimum age to buy the product in question.

In the case of online or remote sales, retailers may require purchasers of age-restricted products to register details or to set up accounts for future purchases, which means that age verification checks may only be required for the initial set-up of accounts or on the first purchase from the website. However, upon delivery or pickup of the product, a live person is still required to perform identity verification to ensure that the person receiving the age-restricted product matches the identity of the person who set up the account used to purchase the product.

Even if the seller of an age-restricted product can successfully verify the age and identity of the purchaser upon receipt of the product, the purchaser may allow an underage person to use the product and the seller would have no way of knowing when or how often this is happening.

Failure to restrict the purchase and use of such products to authorized individuals can lead to adverse consequences to sellers and manufacturers such as lawsuits, sanctions (e.g., geographic restrictions on sales), fines, and even imprisonment. As such, sellers and manufacturers of age-restricted products have an interest in ensuring that such products are purchased by, released to, and used by authorized individuals only.

SUMMARY

Disclosed herein is a controlled dispensing system for restricting the purchasing, release, and usage of controlled products to authorized users. An example controlled product is a product for which usage is controlled by an age restriction (e.g., an electronic cigarette). In one aspect, a consumer sets up an account using any electronic device. Included in the account setup process is an age verification step, so that upon setting up the account, the consumer's age is verified, and the consumer's identity is linked to the account. Also included in the account setup process is a personal electronic device linking step, so that upon setting up the account, the consumer's personal electronic device (e.g., smartphone) is linked to the account.

The user's account information is stored on a server. When the consumer purchases a controlled product, the server obtains a unique product identifier corresponding to the particular controlled product being purchased by the consumer. The server may obtain the unique product identifier as a result of a dispensing machine scanning the purchased product as it is being released to the consumer. Alternatively, the server may preemptively obtain the unique product identifier as the product is being stocked into a dispensing machine (prior to the purchase of the product).

Using the unique product identifier, the server links the purchased product to the consumer's account. As part of this linking process, the purchased product is associated with the consumer's personal electronic device. In some aspects, as a result of this association, the purchased device can only be used when in range of the user's personal electronic device.

Thus, the purchase of the controlled device complies with age-restriction requirements because the consumer verifies his or her age during an account setup process. Additionally, in some aspects, the use of the controlled device complies with age-restriction requirements because functionality of the controlled device is enabled only when in range of the consumer's personal electronic device. This prevents the device from working if the consumer gives it to an underage individual after the purchase is complete.

Importantly, the technical aspects of this system (e.g., automated linking and activation) allow for the purchase and use restrictions to be met as described above without the requirement of a live person (e.g., a store clerk) to conduct an age verification at the point of sale. This technical automation provides for a more efficient user experience, ensures compliance with restrictions regarding controlled devices, and allows controlled devices to be sold remotely by unstaffed dispensing devices, thereby providing for increased availability of controlled devices without sacrificing consumer safety or seller/manufacturer liability.

BRIEF DESCRIPTION OF THE DRAWINGS

FIGS. 6A-6B are diagrams of the various associations between identifiers in accordance with some implementations.

FIG. 10 is a diagram of a dispensing machine row in accordance with some implementations.

FIGS. 16A-16F are diagrams of transaction screens of a user interface associated with product selection in accordance with some implementations.

FIGS. 17A-17B are diagrams of transaction screens of a user interface associated with clerk authentication in accordance with some implementations.

Like reference numerals refer to corresponding parts throughout the several views of the drawings.

DETAILED DESCRIPTION

Disclosed herein are various implementations of systems and methods for dispensing and activating controlled products or, more specifically, systems and methods for restricting the purchase and use of controlled products to individuals who are authorized to use them.

Figure 1:
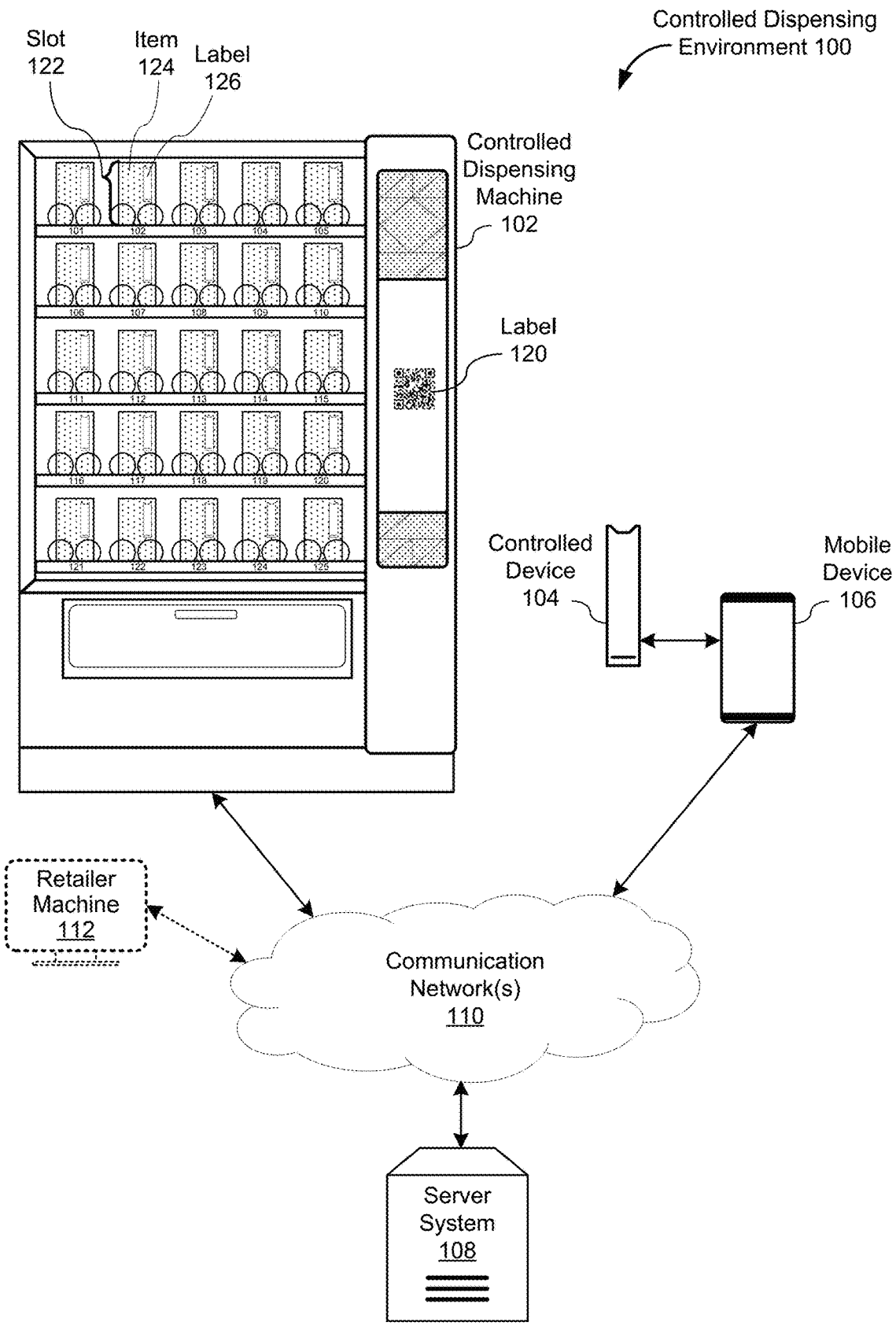
FIG. 1 is a diagram of a controlled dispensing environment in accordance with some implementations.

FIG. 1 is a diagram of a controlled dispensing environment 100 in accordance with some implementations. The environment 100 includes a controlled dispensing machine 102, a controlled device 104, a mobile device 106, and a server system 108. The controlled dispensing machine 102 and the mobile device 106 communicate with the server system 108 over one or more communication networks 110 such as the Internet. The controlled device 104 communicates with the mobile device 106 using a short-range communication network such as Bluetooth Low Energy (BLE). In some implementations, the environment 100 includes a retailer machine 112, such as a computing terminal at a checkout counter in a store, that communicates with the server system 108 over the communication network(s) 110.

The controlled dispensing machine 102 is a machine configured to store a plurality of controlled products, such as item 124, and release them to consumers. The machine 102 may be a vending machine or any other device that stores products or services and dispenses the products or services as a result of transactions involving consumers. The machine 102 can be a wall-mount vending machine or placed on the ground. In some implementations, the machine 102 does not accept cash, coins, or credit cards, and instead acts on instructions received from the server system 108 (e.g., as a result of a consumer selecting an item 124 using a mobile device 106). Machines 102 stocked with controlled devices associated with age restrictions may be located in adult-oriented venues such as bars, convention centers, hotels, airports, clubs, and so forth. Each product is associated with a unique product identifier (e.g., a serial number). The unique product identifier may be disposed on a label 126 of the item 124. The machine 102 includes a plurality of storage positions, sometimes referred to as slots 122. The slots may be disposed across one or more rows and/or columns of the machine 102. The machine 102 is associated with a unique machine identifier. The unique machine identifier may be disposed on a label 120 (e.g., a QR code or a barcode that may be scanned by the mobile device 106). The machine 102 is communicatively coupled to the server system 108 over the network(s) 110.

The controlled device 104 is any product that is associated with a usage restriction. An example usage restriction is an age restriction (e.g., may only be used by those who are 18 and up, 21 and up, or whatever the case me be). Controlled devices 104 may additionally or alternatively be restricted in other ways, such as by identity (e.g., may only be used by a particular individual) or by any other type of attribute associated with one or more individuals. Example controlled devices 104 include electronic cigarettes (e-cigs), electronic vaporizers (vaping pens or vape pens), or any other product including a controlled substance such as tobacco, nicotine, alcohol, marijuana, and so forth. Controlled devices 104 may be products configured to interface with any of the aforementioned example products. For example, a controlled device 104 may be a vaping accessory which may or may not include a controlled substance. Controlled devices 104 may be associated with medicine or any other type of age-restricted substance. Controlled devices 104 may include products which are not associated with legal restrictions, but may be meant for individuals who need to be tracked by the seller or manufacturer, or for whom the transaction itself needs to be tracked by the seller or manufacturer (e.g., for compliance purposes). For example, controlled devices 104 may include communication devices (phones, sim cards, and so forth) which are meant to be sold to adults only, or to individuals for whom the transaction needs to be tracked.

The mobile device 106 is a personal electronic device associated with the consumer (e.g., the consumer's smartphone). Mobile devices 106 include, but are not limited to, smart phones, tablet or laptop computers, or personal digital assistants (PDAs), smart cards, or other technology (e.g., a hardware-software combination) known or yet to be discovered that has structure and/or capabilities similar to the mobile devices described herein. The mobile device 106 includes a long-range communication capability (e.g., modem, transceiver, and so forth) for communicating through the network(s) 110, and a short-range communication capability (e.g., BLE) for communicating with the controlled device 104 and other devices in range of a short-range radio (e.g., Bluetooth radio) of the mobile device 106. Communications between the mobile device 106 and the controlled device 104 take place using short-range communication technology or short-range communication protocol (e.g., Bluetooth (such as Bluetooth 4.0, Bluetooth Smart, Bluetooth Low Energy (BLE)), near-field communication (NFC), Ultra Wideband (UWB), radio frequency identification (RFID), infrared wireless, induction wireless, or any wired or wireless technology that could be used to communicate a small distance (e.g., approximately a hundred feet or closer) that is known or yet to be discovered). The communications technologies described herein may be replaced with alternative communications technologies and, therefore, specific communications technologies are not meant to be limiting. For example, Wi-Fi technology could be replaced with another long-range communications technology.

The server system 108 communicates with the machine 102, the mobile device 106, and the retailer machine 112 through the communication network(s) 110. The server system 108 stores user accounts associated with consumers of the controlled devices 104, and links the various identifiers associated with controlled devices 104 and mobile devices 106 to respective user accounts, as described in more detail below with reference to FIGS. 6-8. The server system 108 includes one or more host processing servers that may be operated by a company associated with the seller of controlled devices 104. For each consumer, the server system 108 may maintain a virtual wallet having a balance (which can be $0) of designated funds for which the server system 108 keeps an accounting. The balance may represent, for example, cash or it may be a promotional value that represents funds that may be spent under certain circumstances. If these funds begin to be depleted, the consumer may be notified (e.g., via an application on the mobile device 106 or via an electronic communication) that additional funds need to be designated and/or transferred. Alternatively, funds from other sources (e.g., a funding source server) may be automatically transferred to restore a predetermined balance.

The communication network(s) 110 include wired and/or wireless communication networks that facilitate connections that are ongoing (e.g., a dedicated connection, a dedicated online connection, and/or a hardwired connection) or accessible on demand (e.g., the ability for the machine 102 to make a temporary connection to the server system 108 or the ability for a consumer to contact the server system 108 from a mobile device 106). Typically the network connection is conducted over long-range communication technology or long-range communication protocol (e.g., hardwired, telephone network technology, cellular technology (e.g., GSM, CDMA, or the like), Wi-Fi technology, wide area network (WAN), local area network (LAN), or any wired or wireless communication technology over the Internet that is known or yet to be discovered.

The retailer machine 112 is any computing device located in the vicinity of the point of sale of a controlled device 104 (e.g., a terminal computing device at a checkout counter in a store). The retailer machine 112 communicates with the server system 108 through the communication network(s) 110 using a long-range communication technology as described above.

Figure 2:
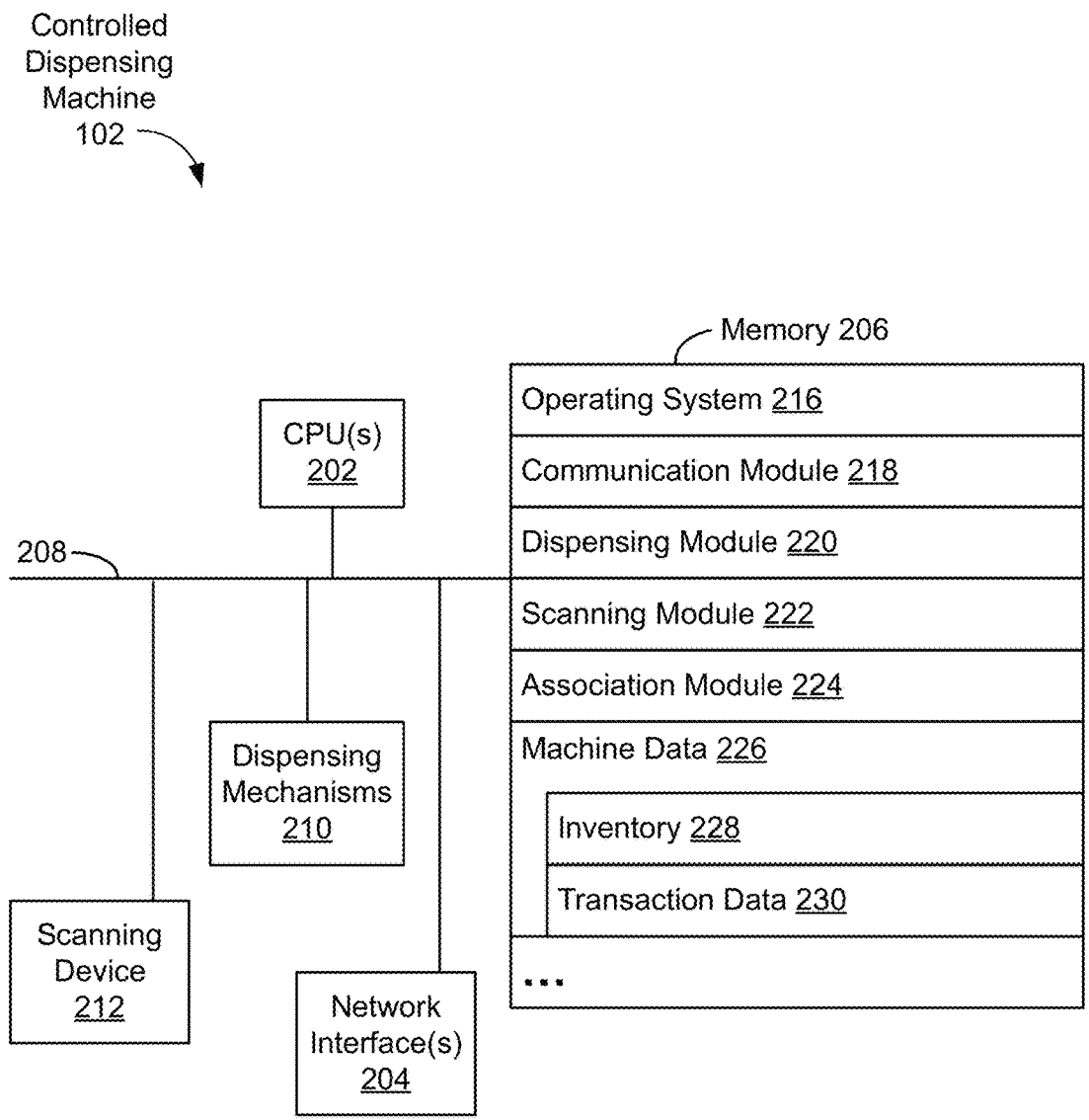
FIG. 2 is a diagram of a controlled dispensing machine in accordance with some implementations.

FIG. 2 is a block diagram illustrating an example controlled dispensing machine 102 of the controlled dispensing environment 100 in accordance with some implementations. The controlled dispensing machine 102 includes one or more processing units (CPUs) 202, one or more network interfaces 204, memory 206, and one or more communication buses 208 for interconnecting these components. The CPU(s) 202, network interface(s) 204, memory 206, and bus(es) 208 may be implemented on an electronic processing unit (e.g., a printed circuit board) and/or in any other type of hardware housing installed or otherwise disposed in the controlled dispensing machine 102.

The controlled dispensing machine 102 includes one or more dispensing mechanisms 210 for releasing the products (items 124) stored therein. Examples include rotating elements that release the next item 124 in a slot 122, or any other type of mechanical component (e.g., a release lever or arm) that physically manipulates the item 124 by causing it to be relocated to an area of the machine 102 in which a consumer can access the released product. In some implementations, the dispensing mechanism(s) 210 move the product to an intermediate area (e.g., for scanning or otherwise obtaining information about the product, such as a product identifier) before moving the product to a release area.

The controlled dispensing machine 102 optionally includes a scanning device 212 for obtaining information about the product (e.g., a product identifier). In some implementations, the scanning device is an imaging device, a laser scanning device, or any other type of scanner configured to scan a barcode or any other type of visual indicator on the surface of a product that is being dispensed in order to obtain the product identifier. In some implementations, the scanning device is a near field communication (NFC) scanning device configured to scan an NFC tag in or otherwise associated with the product as it is being dispensed in order to obtain the product identifier.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- Operating system 216 including procedures for handling various basic system services and for performing hardware dependent tasks;
- Communication module 218 for connecting the controlled dispensing machine 102 to other devices (e.g., the server system 108) via one or more network interfaces 204 (wired or wireless) and one or more communication networks 110, such as the Internet, other wide area networks, local area networks, metropolitan area networks, and so on;
- Dispensing module 220 for controlling the dispensing mechanisms 210 in accordance with dispense instructions received from the server system 108;
- Scanning module 222 for controlling the scanning device 212 in accordance with scan-and-dispense operations;
- Association module 224 for linking a product identifier associated with a scanned and dispensed product with a user identifier associated with the purchase of the scanned and dispensed product; and
- Machine data 226 including:
    - Inventory 228 including a listing of available products stored in the machine 102; and
    - Transaction data 230 including user identifiers and product identifiers involved in current and/or past purchases of products stored in the machine 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
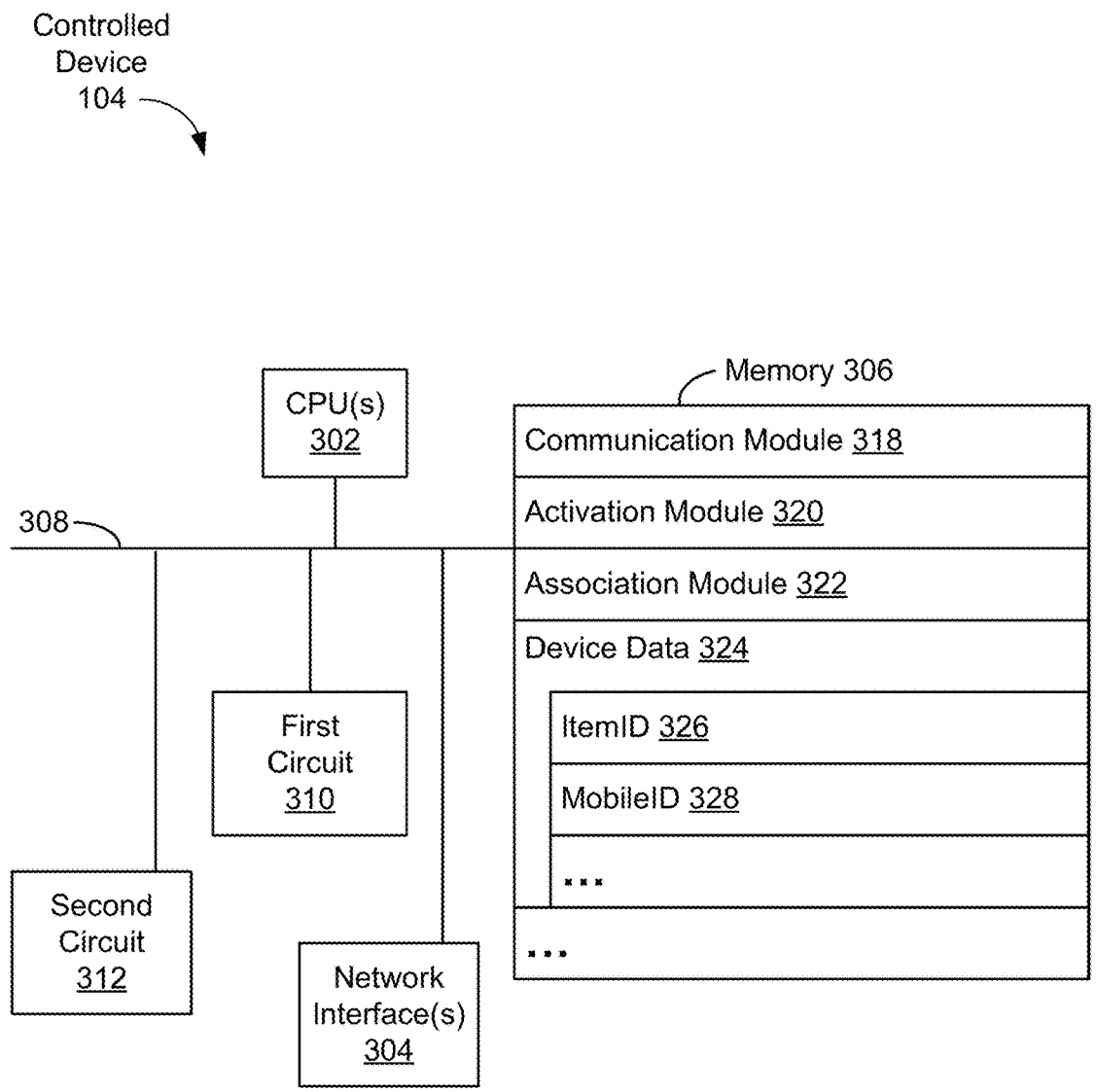
FIG. 3 is a diagram of a controlled device in accordance with some implementations.

FIG. 3 is a block diagram illustrating an example controlled device 104 of the controlled dispensing environment 100 in accordance with some implementations. The controlled device includes one or more processing units (CPUs) 302, one or more network interfaces 304, memory 306, and one or more communication buses 308 for interconnecting these components. The CPU(s) 302, network interface(s) 304, memory 306, and bus(es) 308 may be implemented on an electronic processing unit (e.g., a printed circuit board) and/or in any other type of hardware housing installed or otherwise disposed in the controlled device 104.

The controlled device 104 includes a first electronic circuit 310 for controlling one or more functions that are central to the controlled device 104. For example, if the controlled device is a vaping pen, the first circuit may control a vaporizing function (e.g., heating element and/or temperature sensing circuit) of the vaping pen.

The controlled device 104 includes a second electronic circuit 312 for controlling one or more functions that are ancillary to the controlled device 104. For example, if the controlled device is a vaping pen, the second circuit may control a status display or a battery life indicator of the vaping pen.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Communication module 318 for connecting the controlled device 104 to other devices (e.g., the mobile device 106) via one or more network interfaces 304 (wired or wireless) and one or more short-range communication networks, such as a BLE network;
- Activation module 320 for activating and deactivating the first circuit 310 of the controlled device 104;
- Association module 322 for linking the controlled device 104 to a specific mobile device 106 based on, for example, a successful pairing with the mobile device 106; and
- Device data 324 including:
    - ItemID 326 which is a unique product identifier associated with the controlled device 104; and
    - MobileID 328 which is a unique mobile device identifier associated with a particular mobile device 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
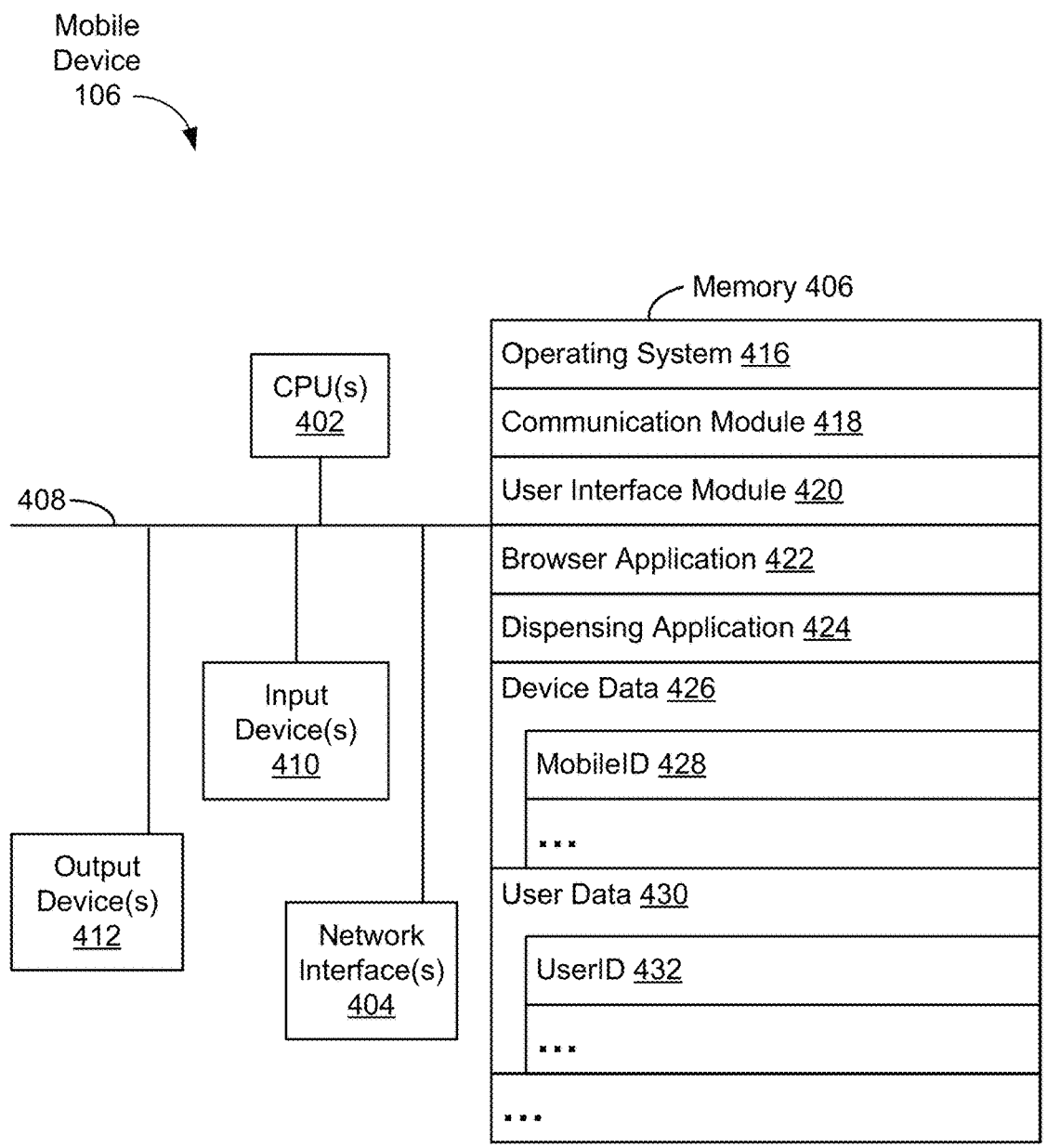
FIG. 4 is a diagram of a mobile device in accordance with some implementations.

FIG. 4 is a block diagram illustrating an example mobile device 106 of the controlled dispensing environment 100 in accordance with some implementations. The mobile device 106 includes one or more processing units (CPUs) 402, one or more network interfaces 404, memory 406, and one or more communication buses 408 for interconnecting these components.

The mobile device 106 includes one or more input devices 410 for receiving user inputs (e.g., a touch screen, a keyboard, a mouse, a microphone, and so forth), and one or more output devices 412 for displaying outputs to a user (e.g., a display screen, a speaker, and so forth).

Figure 7:
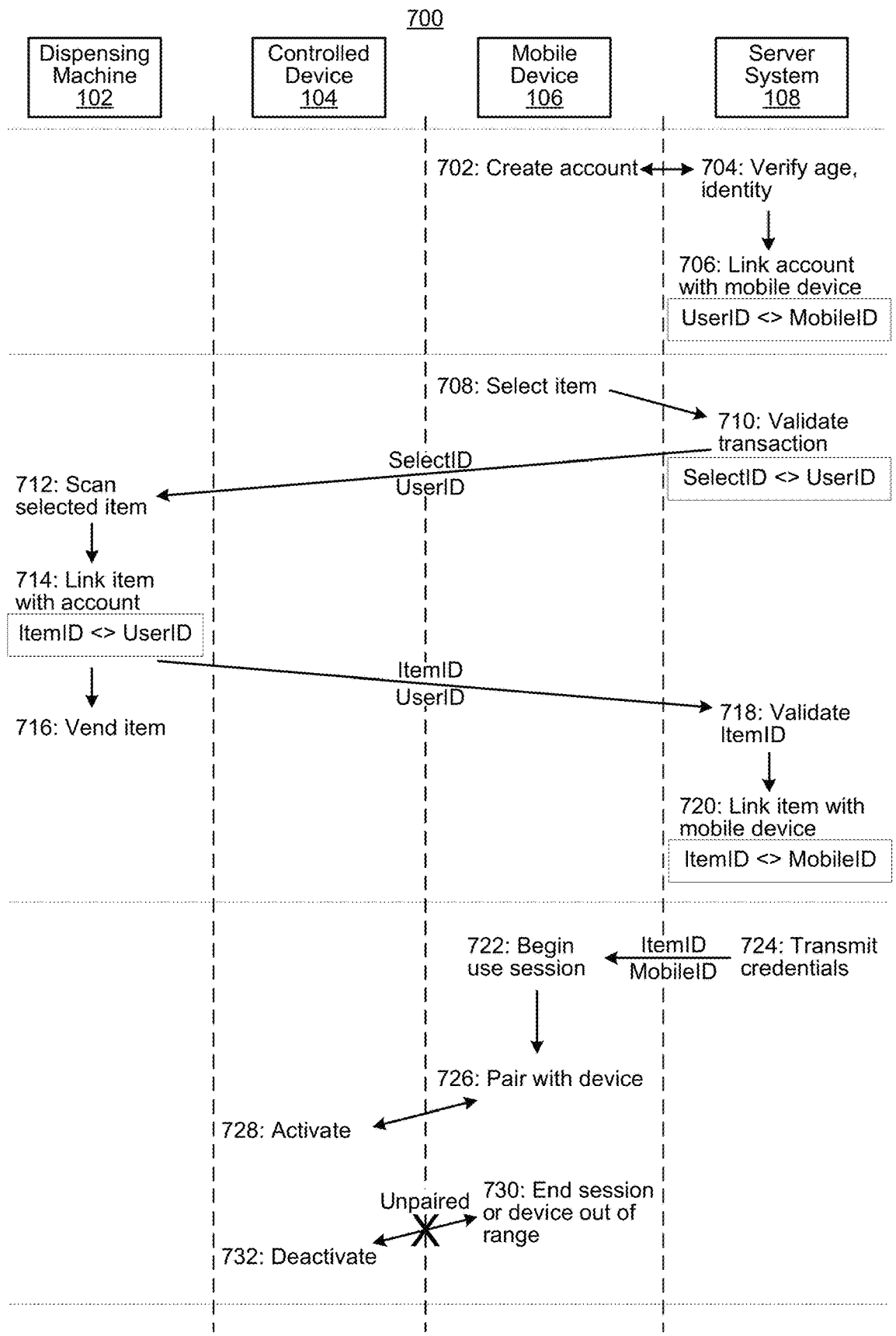
FIG. 7 is a flow diagram showing a method corresponding to the controlled dispensing environment in accordance with some implementations.
Figure 8:
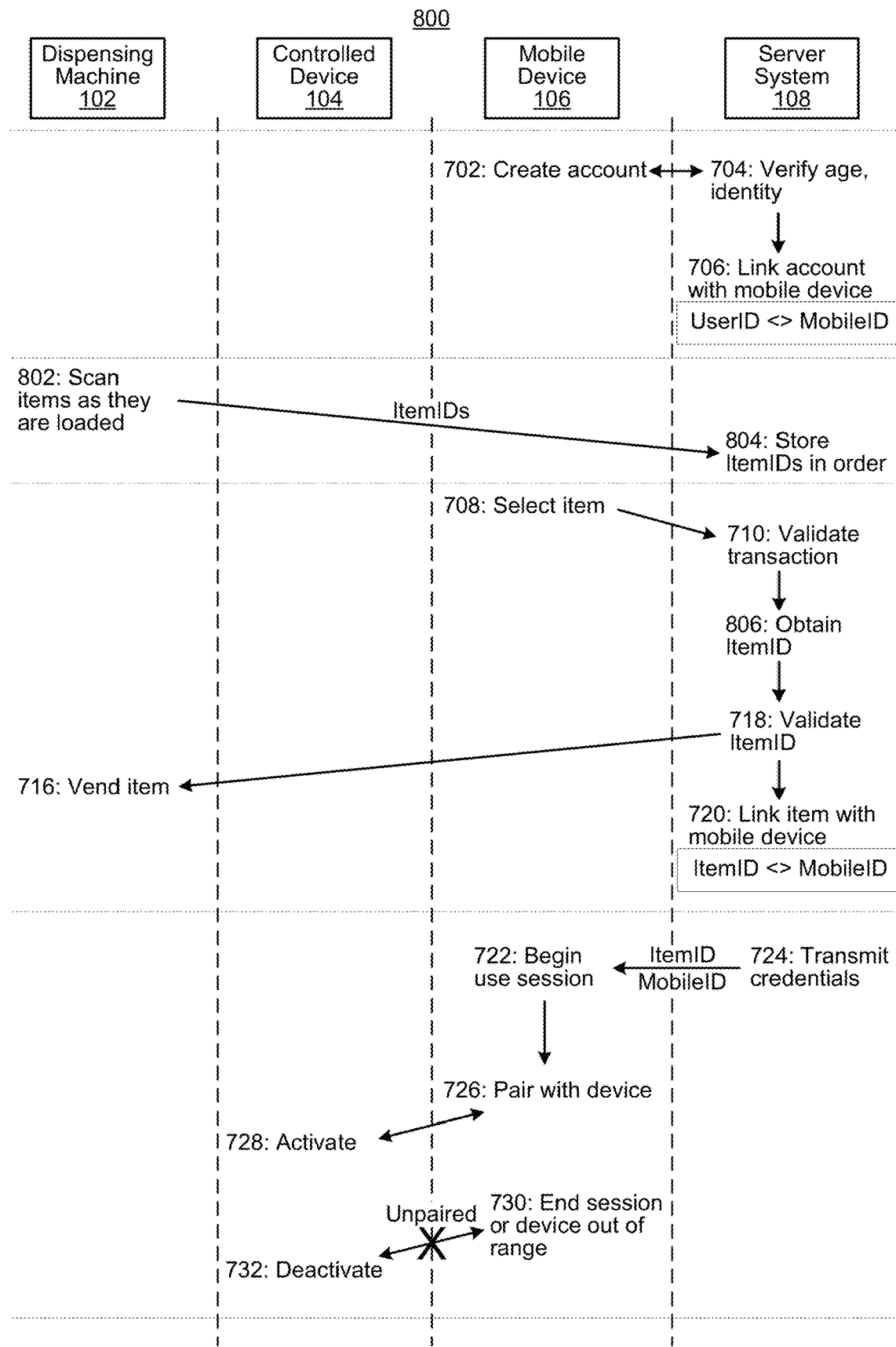
FIG. 8 is a flow diagram showing a method corresponding to the controlled dispensing environment in accordance with some implementations.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

- Operating system 416 including procedures for handling various basic system services and for performing hardware dependent tasks;
- Communication module 418 for connecting the mobile device 106 to other devices (e.g., the server system 108) via one or more network interfaces 404 (wired or wireless) and one or more communication networks 110, such as the Internet, other wide area networks, local area networks, metropolitan area networks, and so on;
- User interface module 420 for receiving inputs from a user via the input device(s) 410 and displaying outputs to the user via the output device(s) 412;
- Browser application 422 for facilitating Internet browsing over the one or more communication networks 110;
- Dispensing application 424 for facilitating product purchases as described below with reference to FIGS. 7-8;
- Device data 426 including a unique mobile device identifier (MobileID 428) associated with the mobile device 106; and
- User data 430 including a unique user account identifier (UserID 432) associated with the user of the mobile device 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

Figure 5:
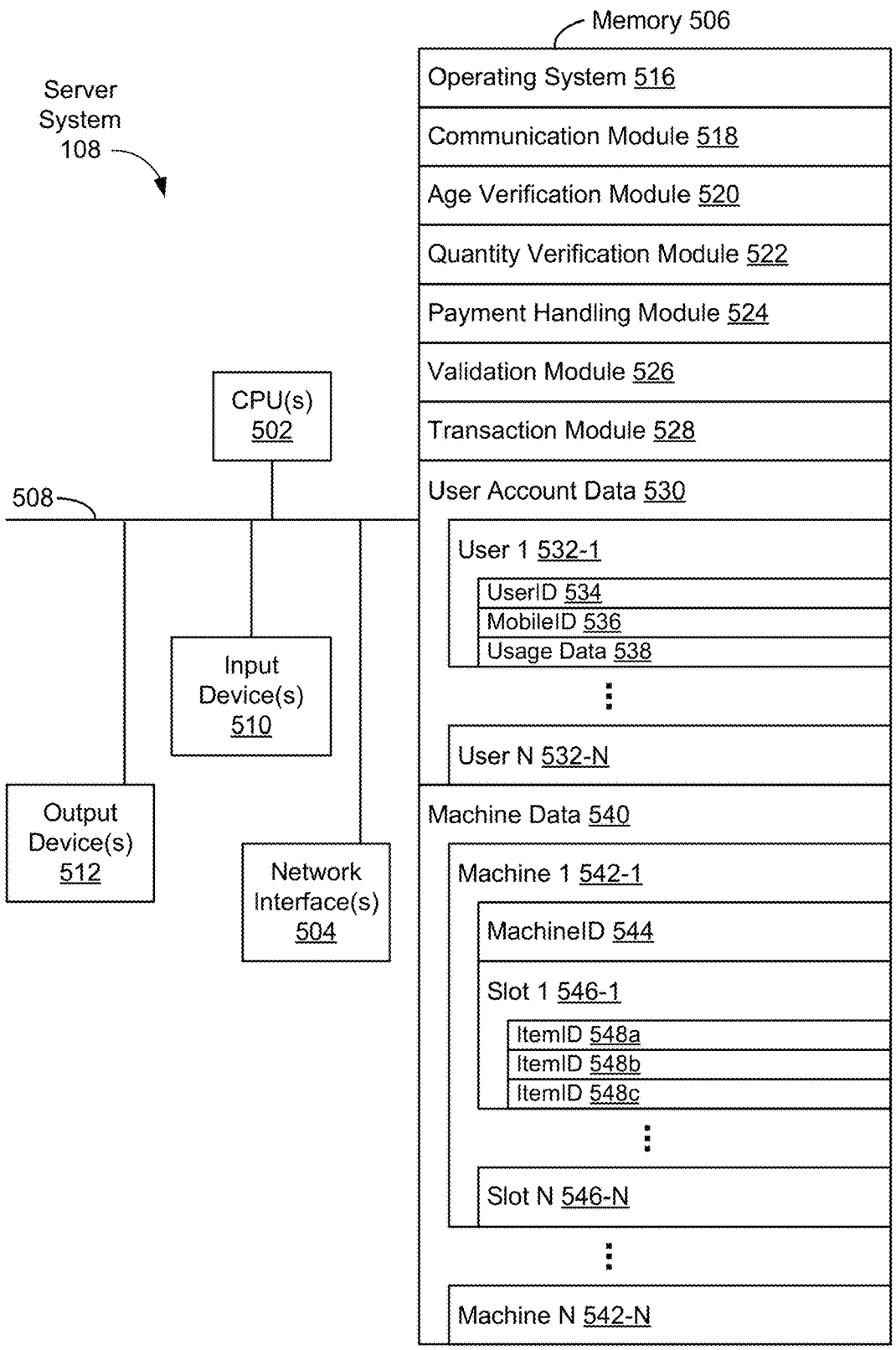
FIG. 5 is a diagram of a server system in accordance with some implementations.

FIG. 5 is a block diagram illustrating an example server system 108 of the controlled dispensing environment 100 in accordance with some implementations. The server system 108 includes one or more processing units (CPUs) 502, one or more network interfaces 504, memory 506, and one or more communication buses 508 for interconnecting these components.

The server system 108 includes one or more input devices 510 for receiving user inputs (e.g., a touch screen, a keyboard, a mouse, a microphone, and so forth), and one or more output devices 512 for displaying outputs to a user (e.g., a display screen, a speaker, and so forth).

Memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

- Operating system 516 including procedures for handling various basic system services and for performing hardware dependent tasks;
- Communication module 518 for connecting the mobile device 106 to other devices (e.g., the machine 102 and the mobile device 106) via one or more network interfaces 504 (wired or wireless) and one or more communication networks 110, such as the Internet, other wide area networks, local area networks, metropolitan area networks, and so on;
- Age verification module 520 for performing one or more age verification processes on consumers as part of the account setup process;
- Quantity verification module 522 for verifying that user accounts satisfy quantity thresholds regarding controlled device purchases and/or usage (e.g., no more than a threshold number of devices purchased within a given amount of time, or no more than a threshold number of uses of a device within a given amount of time);
- Payment handling module 524 for performing payment functions during transactions (e.g., managing account balances, charging funding accounts, and so forth);
- Validation module 526 for validating that a purchased controlled device 104 has not been linked to any other mobile devices 106 before allowing the controlled device 104 to be linked to a particular mobile device 106 as part of a purchase of the controlled device 104;
- Transaction module 528 for facilitating purchases between user accounts and respective controlled devices 104 as described below with regard to FIGS. 7-8;
- User account data 530 including data 532 for a plurality of users accounts, including, for each user account:
  - UserID 534, a unique identifier associated with the user account;
  - MobileID 536, a unique identifier associated with a mobile device 106 which is linked to the user account;
  - Usage Data 538 describing usage statistics of controlled device(s) 104 linked to the user account (e.g., how much and/or how often a particular device is used in a given amount of time); and
- Machine data 540 including data 542 for a plurality of machines 102, including, for each machine:
  - MachineID 544, a unique identifier associated with the machine; and
  - Slot data 546 including scanned ItemIDs 548 associated with controlled devices 104 that have been stocked in the machine.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

The previous section described details of a controlled dispensing machine 102, a controlled device 104, a mobile device 106, and a server system 108 in accordance with some implementations. This section describes various interactions between these devices in a controlled dispensing environment 100 during a transaction. Specifically, when a consumer associated with a user account stored in the server system 108 purchases a controlled device 102 from a controlled dispensing machine 102 using a mobile device 106, these devices interact with each other to link various components of the transaction in a way that restricts the purchase and usage of the controlled device so that only the consumer associated with the user account may purchase the controlled device from the controlled dispensing machine, and only that consumer's mobile device will enable the controlled device to be used by the consumer.

FIG. 6A depicts these links in more detail, in accordance with some implementations. With reference to the first row 602, the consumer sets up an account on the server system 108 using a mobile device 106 (or any other electronic device with access to the server system 108). During the account setup process, the server system identifies the user account with a unique user identifier, referred to herein as "UserID." This process is conditioned on the consumer passing an age verification process. Also, as part of the account setup process, the consumer registers a mobile device 106. During this registration step, the server system 108 assigns a unique identifier to the mobile device 106, referred to herein as "MobileID." Thus, the server system, through the consumer's user account, verifies the consumer's age and associates the UserID with the MobileID. Throughout this application, the term "associates" is synonymous with links, relates, connects, joins, combines, and so forth. Stated another way, the UserID and the MobileID can be described as being linked together, or both linked to the same user account, or both linked to the same consumer through the user account.

With reference to the second row 604, the consumer proceeds to select a controlled device 104 (also referred to herein as an "item") in a particular machine 102. For implementations in which the machine 102 does not have any inputs or money accepting functionality, the consumer makes the selection using a dedicated application on the mobile device, or through a web browser on the mobile device which is pointed to a website associated with the consumer's user account stored on the server system 108. The server system assigns an identifier to the consumer's selection (referred to herein as SelectID). The SelectID may correspond with a particular storage position in the machine (e.g., a slot 122) that contains the desired product. As a result of the selection, server system 108 associates the consumer's SelectID with the UserID. Stated another way, the consumer's selection is linked to the consumer's user account.

With reference to the third row 606, the server system 108 sends a dispense instruction to the machine 102. The dispense instruction initiates a dispensing process which includes an operation for the machine to identify the exact item (among the plurality of items) which is being dispensed (e.g., item 124). Upon obtaining the unique identifier corresponding to the item (referred herein as ItemID), the machine 102 associates the UserID with the ItemID and communicates this association back to the server system 108.

With reference to the fourth row 608, the server system 108 receives the communication with the association of the UserID with the ItemID. Based on the UserID, the server system accesses the consumer's user account obtains the consumer's MobileID (obtained during the account setup). The server system then associates the consumer's MobileID with the ItemID of the vended item and communicates this association to the consumer's mobile device 106. This final association enables the consumer's mobile device 106 (and no other mobile devices which are not registered to the consumer's user account) to activate the item associated with the ItemID. Thus, the controlled device may be enabled only by the mobile device of the age-verified consumer, thereby restricting not only the purchase of the controlled device, but also the usage of the controlled device.

FIG. 6B depicts the aforementioned associations in accordance with alternative implementations. With reference to the first row 612, the consumer sets up an account just as in the account setup process discussed above with reference to row 602. As such, the server system 108 associates the consumer's UserID with the consumer's MobileID.

However, with reference to the second row 614, the server system 108 may have access to the various items in a machine 102 before the consumer even makes a selection. For instance, while a person is stocking the machine 102, the person may scan each item's ItemID and cause the ItemIDs to be uploaded to the server system 108 in the order in which they were scanned, which corresponds to the order in which they were stocked. Thus, the server system 108 need only consult the list of ItemIDs corresponding to a particular machine to know the unique identity of a selected item without requiring the machine 102 to first scan the item during a dispense operation. As such, before the consumer makes a product selection, the server system 108 may associate each SelectID in a particular machine (e.g., each slot 122) with the ItemID corresponding to a particular product (e.g., to each specific item 124 in each specific slot 122).

With reference to the third row 616, by the time the consumer makes a selection, the server system 108 may associate the ItemID with the UserID without first having to wait for the machine 102 to communicate the ItemID, since the ItemIDs are already stored at the server system and already associated with respective SelectIDs. As such, the server system 108 sends the dispense instruction to the machine 102, already knowing the exact ItemID of the item being dispensed.

With reference to the fourth row 618, the server system 108 associates the ItemID of the vended product to the MobileID of the consumer's mobile device 106 based on the information stored in the consumer's user account. The server system sends this association to the mobile device 106 corresponding to the MobileID, thereby enabling the consumer's mobile device 106 to activate the vended controlled device. Thus, the controlled device may be enabled only by the mobile device of the age-verified consumer, thereby restricting not only the purchase of the controlled device, but also the usage of the controlled device.

FIG. 7 is a flow diagram showing a method 700 corresponding to the controlled dispensing environment 100 in accordance with some implementations. The method 700 includes a more specific set of operations for making the various associations described in the previous section.

The method 700 is performed by a controlled dispensing machine 102, a controlled device 104, a mobile device 106, and a server system 108. Method 700 is, optionally, governed by instructions that are stored in a computer memory or non-transitory computer readable storage medium (e.g., memories 206, 306, 406, and/or 506) and that are executed by one or more processors (e.g., CPU(s) 202, 302, 402, and/or 502). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 700 may be combined and/or the order of some operations may be changed.

The method 700 begins when a consumer creates (702) an account. The consumer may use a mobile device 106 to create the account, but this is not required. The consumer may use any electronic device with access to the server system 108 to create the account, as long as the consumer, at some point during the account creation, registers the mobile device 106 as being the mobile device which will eventually be required for activating any vended devices 102. During account creation, the server system 108 performs (704) an age verification process and, in some implementations, an identity verification process. These processes may be combined if the documentation required to verify the consumer's age also verifies the consumer's identity. One example of an age verification process includes the requirement for the consumer to upload an image of an identification document with a picture of the consumer, such as a drivers license, so the server system 108. Then, the server system 108 verifies the authenticity of the identification document (by, e.g., comparing the document to documents in a database and/or using machine intelligence to determine authenticity). The server system 108 verifies the consumer's age based on the identification document. If the consumer meets relevant age requirements, then the server system 108 allows the consumer to create an account. As part of the account creation process, the UserID identifying the consumer and the MobileID identifying the consumer's mobile device 106 are associated (i.e., linked), and this association is stored at the server system 108 with the user's account.

At some point in time subsequent to account creation, the consumer selects (708) a controlled device (referred to as an item) from a particular machine. As part of the selection process, the consumer, using the mobile device 106, scans a machine identifier MachineID (e.g., label 120) which identifies the particular machine to the server system 108. The consumer makes a selection using the mobile device 106, the selection corresponding to a storage position (e.g., slot 122) of the desired item. The mobile device 106 transmits the MachineID and the SelectID to the server system 108. The server system validates (710) the transaction and associates the SelectID with the UserID as described above. The server system transmits the SelectID and UserID to the machine 102 identified by the MachineID. The machine 102 scans (712) the selected item to determine the item's identifier (ItemID), and links (714) the ItemID to the UserID. The machine 102 transmits the linked ItemID and UserID to the server system 108 and vends (716) the selected product (the selected controlled device 104).

The server system 108 validates (718) the ItemID (e.g., verifies that the ItemID has not been previously linked to another user account or mobile device) and links (720) the ItemID to the consumer's MobileID based on the information stored in the user's account (the registered mobile device identifier).

When the consumer is ready to use (722) the controlled device 104, the server system 108 transmits (724) the ItemID to the mobile device 106 identified by the linked MobileID. In some implementations, the server system transmits the ItemID before the consumer is ready to use the controlled device 104, so that when the consumer begins a use session, the mobile device 106 already has the access to the ItemID. The mobile device 106 uses the ItemID to pair (726) with the controlled device 104. Upon a successful pairing, the control device 104 activates (728) its primary functionality (e.g., activates or enables the first circuit 310). The controlled device 104 may remain activated until it is unpaired from the mobile device 106, either as a result of the mobile device 106 ending (730) the session (if the user turns off the mobile device 106 or otherwise actively ends the use session), or as a result of the mobile device 106 being out of range of the controlled device 104. As a result of the unpairing, the primary functionality of the controlled device 104 deactivates (732) (e.g., deactivates or disables the first circuit 310).

FIG. 8 is a flow diagram showing a method 800 corresponding to the controlled dispensing environment 100 in accordance with some implementations. The method 800 includes an alternative set of operations for making the various associations described in the previous section.

The method 800 is performed by a controlled dispensing machine 102, a controlled device 104, a mobile device 106, and a server system 108. Method 700 is, optionally, governed by instructions that are stored in a computer memory or non-transitory computer readable storage medium (e.g., memories 206, 306, 406, and/or 506) and that are executed by one or more processors (e.g., CPU(s) 202, 302, 402, and/or 502). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 700 may be combined and/or the order of some operations may be changed.

The method begins when a consumer creates (702) an account and the server system performs (704) verifications and links (706) the UserID with the MobileID as described in method 700. However, in method 800, the server system 108 preemptively obtains ItemIDs of the items as they are loaded into the machine. An individual, while stocking the machine, scans (802) the items are they are loaded into their respective slots, and the server system 108 stores (804) the ItemIDs in the order in which they were loaded and scanned, as described with reference to FIG. 6B above. That way, when the consumer selects (708) and item and the server system validates (710) the transaction, the server system can obtain (806) the ItemID corresponding to the consumer's selection without waiting for the dispensing machine 102 to vend the item, scan the ItemID, and upload the ItemID. The rest of the method corresponds to similarly numbered operations as described in method 700.

Alternative Implementations

Alternative approaches to the controlled dispensing methods described above include scenarios in which one or more of the operations are performed by a person. For instance, in some implementations, a consumer may convey intent to purchase a particular controlled device (e.g., 104) to a retailer (e.g., an employee using a retailer machine 112). The consumer may (i) pay the retailer over the counter or via an application (e.g., executing on the consumer's mobile device 106 or on the retailer machine 112) and/or (ii) show the retailer his or her identification over the counter or verify his or her identity and/or age via an application (e.g., executing on the consumer's mobile device 106 or on the retailer machine 112). The retailer approves the purchase and provides a transaction code (e.g., a QR code) to the consumer. The transaction code may be (i) printed from (or caused to be printed by) the retailer machine 112, or (ii) pre-printed (e.g., on a card). The consumer proceeds to the machine 102 and scans the machine identifier (e.g., label 120) (e.g., using the mobile device 106). Any combination of the machine 102 and the mobile device 106 transmits the transaction code and the machine identifier to the server system 108, which validates the transaction using any of the operations described above with reference to FIGS. 6A-8. Upon validation of the transaction, the server system 108 instructs the machine 102 (via network(s) 110) to dispense the controlled product (e.g., the product specified by the transaction code). Alternatively, the server system 108 sends a communication to the retailer machine 112 notifying the retailer that the transaction has been validated, and in response, the retailer may hand the controlled device to the consumer. In some implementations, in order to activate the controlled device, the consumer uses the transaction code that was provided by the retailer.

In another alternative approach, consumers use controlled dispensing machines 102 as pickup terminals for products purchased online. In some implementations, a consumer purchases a particular controlled device on a website or application via the mobile device 106 and network(s) 110. Payment and identification verification are handled through the website or application, as described above. Upon a successful payment and identification verification, the website or application directs the consumer to a particular machine 102 (e.g., based on distance and/or product availability), or to any machine 102 (e.g., one that the consumer may decide to use) to receive the controlled device. At the machine 102, the consumer scans the machine identifier (e.g., label 120) using the mobile device 106, and the server system 108 instructs the machine 102 to dispense the controlled device based on any of the operations described above with reference to FIGS. 6A-8. In some implementations, the dispensed device is then associated with the consumer (via the user's account) and/or the consumer's mobile device, as described above with reference to FIGS. 6A-8.

Controlled Device Packaging

In the approaches described above, a controlled device 104 may be activated upon being dispensed and being associated with a user account and/or a mobile device. In some implementations, the controlled device 104 may be activated or otherwise unlocked prior to dispensing (while it is still in the machine 102). In such implementations, an authorized consumer may use a controlled device as soon as it is dispensed.

Figure 9:
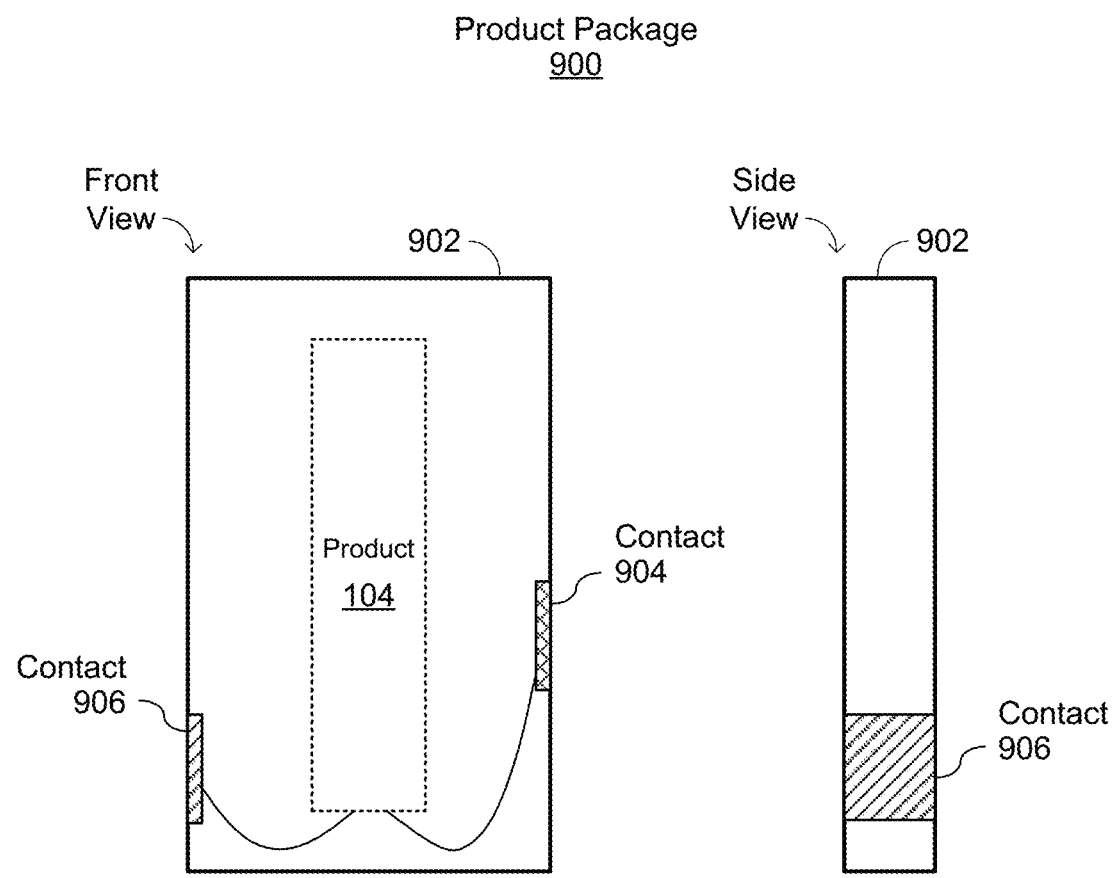
FIG. 9 is a diagram of a product package in accordance with some implementations.

FIG. 9 depicts front and side views of a product package 900 in accordance with some implementations. A controlled device (e.g., 104) is disposed inside a shell 902 of the package 900. The controlled device 104 is electrically coupled to two power contacts 904 and 906 (e.g., via respective wires). The power contacts may be vertically displaced so as to ensure proper polarity when placing the package 900 into the machine 102. For example, contact 904 may be a positive power contact and contact 906 may be a negative power contact. The power contacts comprise any electrically conductive material. When power is applied via the contacts 904 and 906, the controlled device 104 may be powered on (e.g., for the purpose of receiving activation signals). The package shell 902 optionally includes one or more communication contacts (not shown) (e.g., two contacts for serial peripheral interface communication), which are electrically coupled to communication circuitry of the controlled device 104.

FIG. 10 depicts front and side views of a row 1000 of the machine 102 in accordance with some implementations. The row includes one or more shelves 1002, and each shelf 1002 includes one or more controlled devices in package shells 902. Each shelf 1002 is lined with power rails 1014 (one on each side of the controlled devices) electrically coupled to power contacts 1004 and 1006 (corresponding to contacts 906 and 904 of the package shell 902), and guides 1008 and 1010. The power contacts 1006 may include springs to keep tension on the packages shells 902, and the guides may be sized to keep the product shells 90s aligned on the shelf 1002. The power rails 1014 electrically couple the power contacts 1004 and 1006 to power provided by a power bus of the machine 102. In some implementations, the shelves 1002 include dispensing spirals 1012 or other types of pushing mechanisms for dispensing products. Each shelf 1002 optionally includes one or more communication rails (not shown) having contacts configured to be physically coupled to communication contacts of the package shell 902. In some implementations, only the package in the front-most slot is in contact with the communication rail(s), so that communications sent through the rail(s) are only received by the package that is about to be dispensed.

Figure 11:
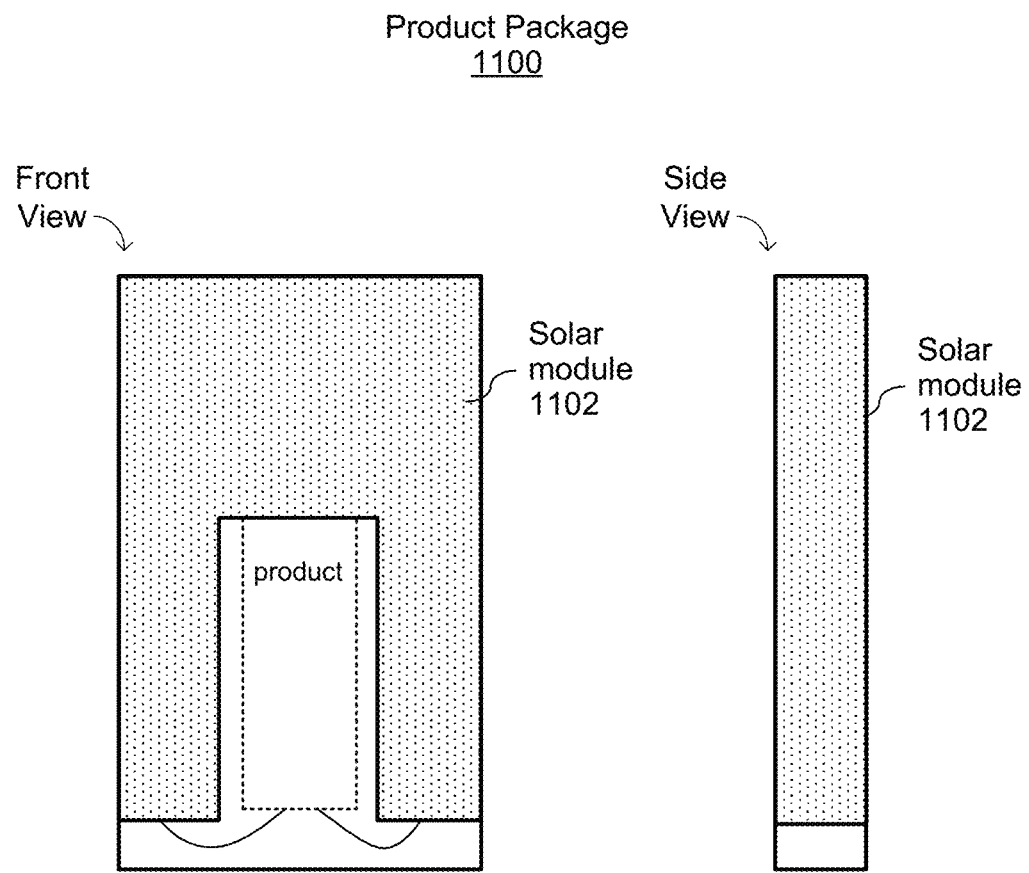
FIG. 11 is a diagram of a product package in accordance with some implementations.

FIG. 11 depicts front and side views of a product package 1100 in accordance with some implementations. The product package 1100 corresponds with the product package 900, and it includes power contacts (not shown) as described with reference to contacts 904 and 906 in FIG. 9. Instead of the contacts receiving power from power rails 1014, however, the contacts receive power from a solar module 1102 (e.g., solar cells or any other type of solar power generating material) integrated into (or in physical contact with) the packaging of the controlled device. As described above, the package shell optionally includes one or more communication contacts (not shown) (e.g., two contacts for serial peripheral interface communication), which are electrically coupled to communication circuitry of the controlled device 104. In some implementations, the solar module 1102 of the package 1100 may continue to keep the controlled device 104 charged even after it is dispensed (e.g., by a user placing the package 1100 to sunlight or other types of light).

Figure 12:
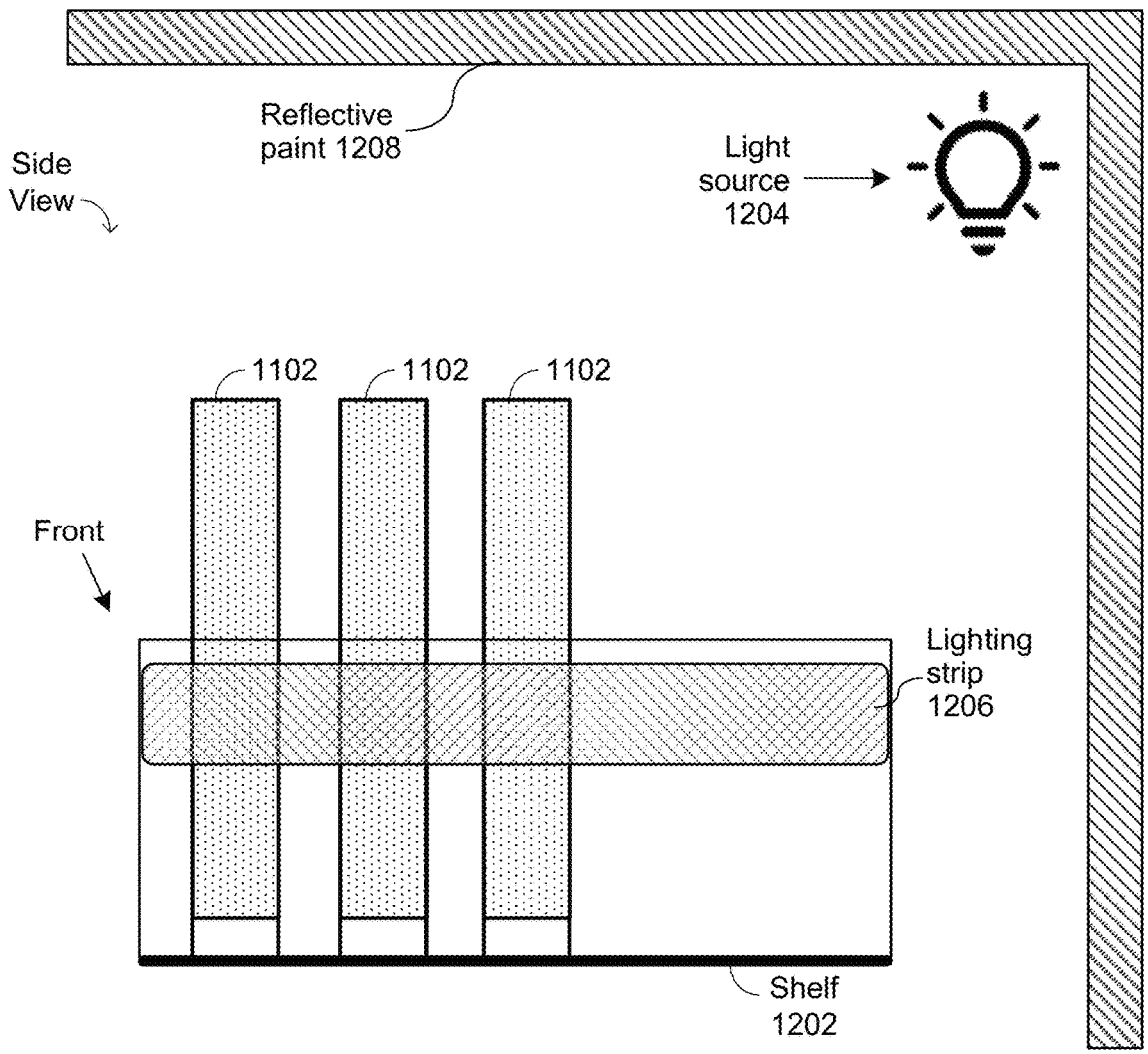
FIG. 12 is a diagram of a dispensing machine row in accordance with some implementations.

FIG. 12 depicts a front view of a row 1200 of the machine 102 in accordance with some implementations. The row includes one or more shelves 1202, and each shelf 1202 includes one or more controlled devices in package shells with solar modules 1102. The machine 102 includes an internal light source 1204, which not only provides lighting for consumers to view the products within the machine, but also provides lighting for the solar modules 1102. In order to optimize the amount of light that reaches the solar modules 1102, each shelf 1202 optionally includes a lighting strip comprising reflective material, and portions of the interior surface of the machine are optionally covered with reflective paint 1208 or any other kind of reflective material. Each shelf 1002 optionally includes one or more communication rails (not shown) having contacts configured to be physically coupled to communication contacts of the package shell 902. In some implementations, only the package in the front-most slot is in contact with the communication rail(s), so that communications sent through the rail(s) are only received by the package that is about to be dispensed.

The controlled device packages described above provide power and, optionally, communications to respective controlled devices. In some implementations, controlled devices 104 are locked (or otherwise deactivated) when they are loaded into a machine 102. The packing for each controlled device 104 keeps the respective controlled devices in a charged state. As described above with reference to FIGS. 6A-8, a consumer purchases a particular controlled device 104. However, instead of a deactivated device being dispensed (e.g., in operation 716) and activated outside the machine 102 (e.g., in operation 728), the device may be activated before it is dispensed. The machine 102 may communicate with the device that is about to be dispensed and send an unlock code to the device's firmware. This unlocks the controlled device without requiring the controlled device to be paired to a mobile device 106. In some implementations, the controlled device 106 may be permanently unlocked. In some implementations, the communication to unlock the controlled device may be wireless (e.g., via a wireless communication module of the machine 102 using, for example, Bluetooth), or wired (e.g., via serial communication bus through communication contacts in the packaging as described above).

Controlled Dispensing

Figure 13:
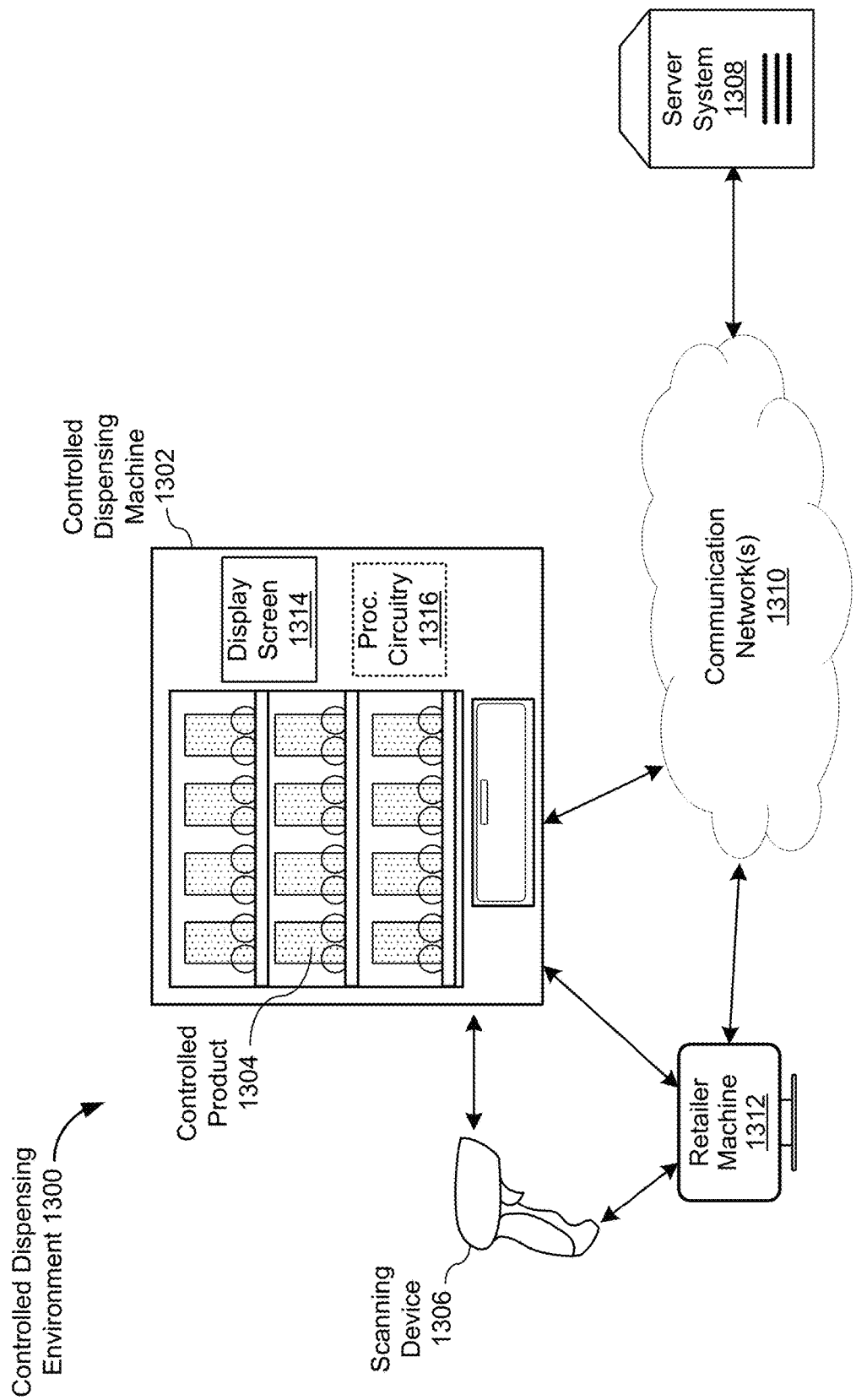
FIG. 13 is a diagram of a controlled dispensing environment in accordance with some implementations.

FIG. 13 is a diagram of a controlled dispensing environment 1300 in accordance with some implementations. In the environment 1300, a controlled dispensing machine 1302 (also referred to as a smart trade fixture) dispenses controlled products 1304 in accordance with a controlled dispensing process 1400 (described with reference to FIG. 14 below) involving (i) product identification and validation, (ii) consumer validation and/or risk evaluation, and/or (iii) clerk authentication. The dispensing environment 1300 and dispensing process 1400 provide safety protections for consumers as well as liability protections for retailers and manufacturers.

The controlled dispensing environment may include a retailer machine 1312, such as a point-of-sale device or any other kind of computing device operated by a service provider such as a clerk. The retail machine 1312 may support dispensing aspects of transactions regarding the controlled products 1304 (e.g., controlling the dispensing machine 1302) and/or non-dispensing aspects of transactions regarding the controlled products 1304 (e.g., payment processing).

The dispensing machine 1302 is controlled via (i) a user interface on a display screen 1314 (described with reference to FIGS. 15-18 below), (ii) an optional scanning device 1306 (while the scanning device adds efficiency to the controlled dispensing process, manual data input via the user interface may serve as a substitute), and (iii) processing circuitry 1316 including or in communication with memory storing programs that, when executed by elements of the processing circuitry, perform one or more of the functions described below with reference to FIGS. 14-19. The display screen 1314, scanning device 1306, and processing circuitry 1316 may be distributed among any combination of the dispensing machine 1302 and a retailer machine 1312 as described in the following discussion.

In some implementations, the display screen 1314, scanning device 1306, and processing circuitry 1316 are integrated into the dispensing machine 1302. For these implementations, a retailer machine 1312 may not be required to perform dispensing aspects of transactions regarding the controlled products 1304. The scanning device 1306 may be integrated into the structure of the dispensing machine 1302 or may be a separate component (e.g., a remote barcode scanner). For example, the scanning device 1306 may be a handheld scanner communicatively coupled (paired) to the dispensing machine 1302 using a wired or wireless communication link (e.g., USB, Ethernet, Wi-Fi, Bluetooth, etc.).

In some implementations, the display screen 1314 is included in the retailer machine 1312, and the scanning device 1306 and processing circuitry 1316 are integrated into (or are otherwise in communication with) the dispensing machine 1302. For these implementations, the retailer machine 1312 provides means to interact (e.g., the display screen and associated UI) with the processing circuitry 1316 in the dispensing machine 1302.

In some implementations, the display screen 1314, the scanning device 1306, and the processing circuitry 1316 are integrated into (or are otherwise in communication with) the retailer machine 1312. For these implementations, the retailer machine 1312 provides means to interact (e.g., the display screen and associated UI) with the processing circuitry 1316, and serves as the controller for the dispensing machine 1302 (e.g., by providing dispensing instructions to the dispensing machine 1302).

For implementations in which the retailer machine 1312 is involved in dispensing aspects of transactions regarding the controlled products 1304 (e.g., at least a portion of the processing circuitry 1316 is integrated in the retailer machine 1312), the retailer machine 1312 may communicate with the dispensing machine 1302 using a secured connection, either wired or wireless. In some implementations, the secured connection is encrypted, so as to provide additional security to prevent unauthorized dispensing of the controlled products 1304. In some implementations, the retailer machine 1312 is a handheld computing device configured to wirelessly communicate with the dispensing machine 1302.

In some implementations, the processing circuitry 1316 (integrated into the dispensing machine 1302 and/or the retailer machine 1312) communicates with a server system 1308 via one or more local and/or wide area communication networks 1310 (e.g., Wi-Fi, the Internet, etc.). The server system 1308 may be located in the same location as the dispensing machine 1302 (e.g., in the same store), or may be located in a remote location (e.g., at a server farm operated by or otherwise having operations associated with a manufacturer of the controlled products 1304).

The controlled products 1304 may be age-restricted, as described throughout this disclosure (e.g., cigarettes, vaping products, alcohol, *cannabis*, etc.). The controlled products 1304 may not be age-restricted, but instead may be identity-controlled, such as products that may be purchased by consumers of any age but require the consumer to show identification upon purchase of the product (e.g., spray paint, calling cards, pharmaceutical products, etc.). The controlled products 1304 may be both age-restricted and identity-controlled. The controlled products 1304 may include any controlled device (e.g., the controlled devices described throughout this disclosure) and/or accessories, cartridges, refills, pods, or any other products designed for use with such devices.

Figure 14:
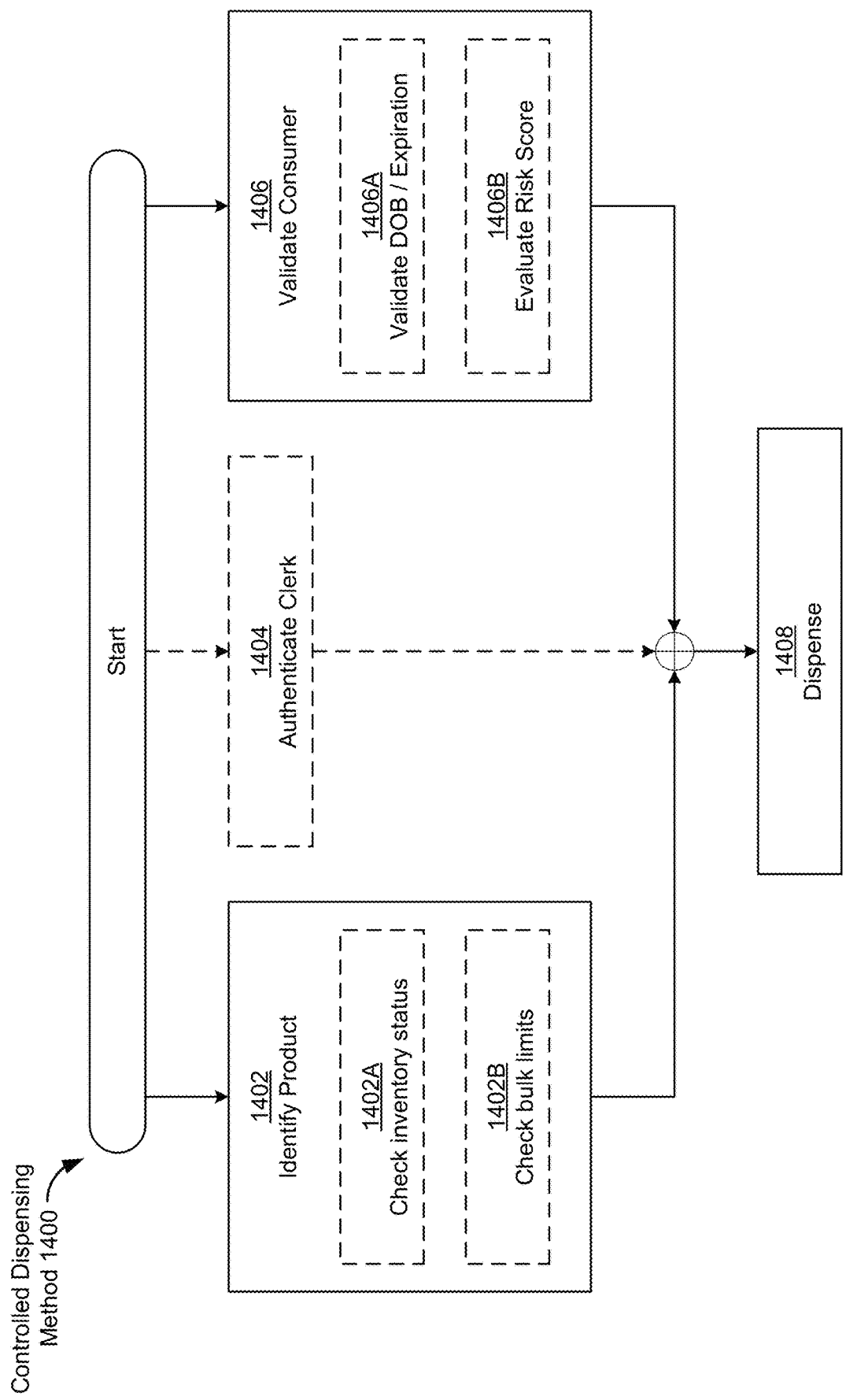
FIG. 14 is a diagram of a controlled dispensing method in accordance with some implementations.

FIG. 14 is a flow diagram of a controlled dispensing method 1400 in accordance with some implementations. The method 1400 is, optionally, governed by instructions that are stored in a computer memory or non-transitory computer readable storage medium and that are executed by one or more processors (e.g., processing circuitry 1316). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 1400 may be combined and/or the order of some operations may be changed. Optional operations are conveyed with dashed lines.

The method 1400 may begin as a result of a consumer signaling his or her intention to purchase a controlled product 1304. The consumer may have identified the controlled product 1304 using a placeholder (e.g., empty packaging, paper, or cardboard) in the store identifying the product that the consumer has selected. The consumer may have built a shopping card on a mobile application or website, and such application or website may provide an identifier (e.g., a barcode) associated with the shopping cart or product selections. The consumer may point to a particular controlled product 1304 on the display of the dispensing machine 1302 or the retailer machine 1312. The consumer may point to a particular controlled product 1304 on signage or a countertop mat that has the product name or image. The consumer may verbally convey to a clerk a particular controlled product 1304 that is desired for purchase. Regardless of the product identification method, as a result of a particular controlled product 1304 being identified, the dispensing method 1400 may be executed. The inputs required by the dispensing method 1400 (described below with reference to operations 1402, 1404, and 1406) may be provided by a clerk, a consumer, or any combination thereof.

In order to dispense the desired controlled product 1304 the processing circuitry 1316 of the dispensing machine 1302 or the retailer machine 1312 requires at least one of the operations 1402, 1404, and 1406 to be performed. The operations may be executed in any order. For example, operation 1402 may be executed, optionally followed by operations 1404 and/or 1406 (or 1406 and/or 1404). Alternatively, operation 1404 may be executed, optionally followed by operations 1402 and/or 1406 (or 1406 and/or 1402). Alternatively, operation 1406 may be executed, optionally followed by operations 1402 and/or 1404 (or 1404 and/or 1402). The subset of operations 1402, 1404, and 1406 that are required to perform the dispensing operation 1408 may be customizable (e.g., by a store operator, by a manufacturer, etc.) based on a desired level of safety and/or liability protection.

In operation 1402, the processing circuitry 1316 identifies a controlled product 1304. The product may be identified based on any of the consumer or clerk actions described above with regard to providing a product identification. For example, a product identifier such as a barcode or image representing the product may be selected (on the user interface) or scanned using the scanning device 1306 (e.g., by scanning a barcode on a sheet of barcodes representing available products, or by scanning a code on a mobile device of the consumer).

In some implementations, upon receipt of the product identifier, the processing circuitry 1316 checks (1402A) inventory status of the identified product, and/or checks (1402B) bulk sale limits of the identified product. Bulk sale limits may restrict the number of products that may be purchased (i) in a single transaction by a consumer, and/or (ii) by a single consumer within a predetermined amount of time. Such limits may be applied on a per product basis (e.g., only four of a particular product may be purchased per transaction), a per product category basis (e.g., only one product of a first type and four products of a second type may be purchased per transaction), per total item basis (e.g., only eight total items per transaction may be purchased), and so forth. Such limits may be applied based on time between purchases for a particular consumer (e.g., a consumer may only purchase four items per day, or per month).

In accordance with bulk limit processing, the processing circuitry 1316 may track a consumer's transactions (and by extension, how many and which products have been purchased) by tracking the consumer's identification (obtained in operation 1406 below). The consumer's transactions may be tracked locally (e.g., at the processing circuitry 1316 of a particular dispensing machine 1302 or retailer machine 1312), or across a network (e.g., by a tracking process implemented at the server system 1308 in communication with processing circuitry 1316 of a plurality of dispensing machines 1302 and/or retailer machines 1312).

In accordance with bulk limit processing, the processing circuitry 1316 may adjust bulk limits for a particular consumer based on a risk score for the consumer. The processing circuitry 1316 may evaluate the consumer's risk score in operation 1406 below. The higher the risk score, the lower the bulk limits for a particular transaction may be adjusted. Likewise, the lower the risk score, the higher the bulk limits for a particular transaction may be adjusted.

In operation 1404, the processing circuitry 1316 identifies and authenticates the clerk. This operation is optional, and may not be required for every transaction. The processing circuitry 1316 may authenticate the clerk by scanning a badge or access card of the clerk using the scanning device 1306. Upon such a scan, the clerk may be logged in to the dispensing machine 1302 and/or the retailer machine 1312, and as a result, dispensing operations associated with the authorized clerk may be unlocked (authorized) for the dispensing machine 1302 and/or the retailer machine 1312. Operation 1404 may be performed before operation 1402. In some implementations, upon execution of operation 1404, the clerk may be authenticated for a predetermined amount of time (e.g., a four-hour shift), during which the clerk remains authenticated for subsequent transactions and dispensing operations. Alternatively, operation 1404 may be required to be executed for each subsequent dispensing operation, in order to provide more detailed records regarding the approval process for each dispensing operation of a controlled product 1304.

In operation 1406, the processing circuitry 1316 identifies and validates the consumer. The processing circuitry 1316 may identify the consumer and validate (1406A) the customer's age and/or identification card validity based on information on the consumer's identification card (e.g., name, date of birth, expiration date, and/or license number on the consumer's driver's license). This information may be obtained by the scanning device 1306 or manually entered using the user interface on the display screen 1314. As part of this operation, the clerk has an opportunity to physically verify that an image on the consumer's identification card matches the consumer's appearance. Accordingly, the clerk authentication operation (1404) may serve as a digital signature or an electronic record of the clerk having verified the consumer's identification and/or age for a particular transaction and dispensing operation.

In some implementations, upon identifying the consumer and/or verifying the consumer's identity, the processing circuitry 1316 may evaluate, determine, or otherwise obtain a risk score (1406B) of the consumer. The risk score may be determined locally based on the consumer's purchase history (e.g., how many and which products have been purchased per transaction, per day, per month, and so forth). The risk score may be determined remotely (e.g., by a risk determination process implemented at the server system 1308 in communication with processing circuitry 1316 of a plurality of dispensing machines 1302 and/or retailer machines 1312). The consumer's risk score may be based on the number of products purchased in a particular time period, the number of transactions in a particular time period. The higher the number of products purchased, or the higher the number of transactions, the higher the risk score. Likewise, the lower the number of products purchased, or the lower the number of transactions, the lower the risk score. The risk score may be influenced by other risk factors, such as purchase activity (e.g., whether products were purchased in different states over a short interval of time) and/or purchase location characteristics (e.g., locations with historically high crime and/or medical activity, or locations in proximity to schools).

Upon obtaining the consumer's risk score, the processing circuitry 1316 may evaluate the risk score by comparing the number and/or types of products identified (or to subsequently be identified) in operation 1402 to thresholds that are set in accordance with the risk score. Higher risk scores may be associated with lower thresholds, and lower risk scores may be associated with higher thresholds. The higher the threshold, the more products the consumer may be allowed to purchase, and/or the more transactions the consumer may be allowed to complete in a predetermined time period (e.g., per day, per week, per month, etc.). The thresholds may be determined on a location-by-location basis. For example, depending on the store and how much risk a manager of a store is willing to take on, thresholds for that store may be adjusted accordingly.

Upon applying the risk score by comparing the thresholds associated with the risk score with the products identified in operation 1402, the processing circuitry 1316 may allow or not allow the requested products to be dispensed. If the requested products are not allowed to be dispensed, the consumer may decrease a number of products identified in operation 1402 for dispensing, or cancel the dispensing operations altogether. Once the transaction is complete, the processing circuitry 1316 may update the consumer's risk score (or cause the consumer's risk score to be updated) based on the number and/or type of products that were dispensed.

In operation 1408, the processing circuitry 1316 approves for dispensing the controlled products 1304 identified in operation 1402. Upon approval for dispensing, the processing circuitry 1316 may dispense, or cause to be dispensed, the approved products upon receiving a command via the user interface (e.g., selection of a "Dispense" element). The processing circuitry 1316 approves the identified products for dispensing in accordance with successful completion of operations 1402, 1404, and/or 1406 (depending on which of those operations were required). For example, if all three operations were required, then the processing circuitry 1316 approves for dispensing the products identified in operation 1402 (optionally, upon positive inventory and bulk limit determinations) as long as the clerk has been authenticated in operation 1404 and the consumer has been validated in operation 1406 (optionally, upon validation of age and/or identity, and/or a positive risk evaluation due to requested products meeting risk thresholds). If at least one of these required operations has not completed successfully, the processing circuitry 1316 does not approve for dispensing the products identified in operation 1402. In such a scenario, the processing circuitry 1316 may provide a message via the user interface on the display screen 1314 regarding which operations failed to complete successfully and/or any steps that need to be performed in order to successfully complete a particular operation.

The controlled dispensing method 1400 governs the dispensing of controlled products 1304 in accordance with transactions initiated by consumers. Other aspects of such transactions, such as payment processing may or may not involve the dispensing machine 1302.

In some implementations, dispensing and payment operations may be integrated into the same process. For example, upon the identification of products in operation 1402, or the approval for dispensing of such products in operation 1408, the processing circuitry 1316 may provide those products (e.g., by transmitting product identifiers associated with the identified and/or approved products), or provide prices associated with those products, to the retailer machine 1312, which performs payment functions (e.g., determining an amount owed based on product prices, taxes, discounts, etc.; collecting payment by processing a credit card transaction; providing a receipt; and so forth).

In some implementations, dispensing and payment operations may be processed separately, either in parallel or in sequence. For example, while the processing circuitry 1316 of the dispensing machine 1302 is performing dispensing operations (method 1400), the retailer machine 1312 may perform payment operations (e.g., including the clerk manually entering an amount to be charged or selecting the identified products, and performing the other payment operations described above). Alternatively, the clerk may process payment first, using the retailer machine 1312, and upon successful receipt of payment, cause the dispensing machine 1302 to perform dispensing operation. Alternatively, the clerk may cause the dispensing machine 1302 to perform dispensing operations first, and upon successful dispensing of the requested products, cause the retailer machine 1312 to perform payment operations.

FIGS. 15-18 depict example user interface screens (e.g., for display on the display screen 1314) in accordance with some implementations. The example user interfaces may support touch interaction or voice interaction. For touch interaction implementations, the example screens may display one or more selectable affordances that, upon selection, execute one or more commands and described below.

Figure 15:
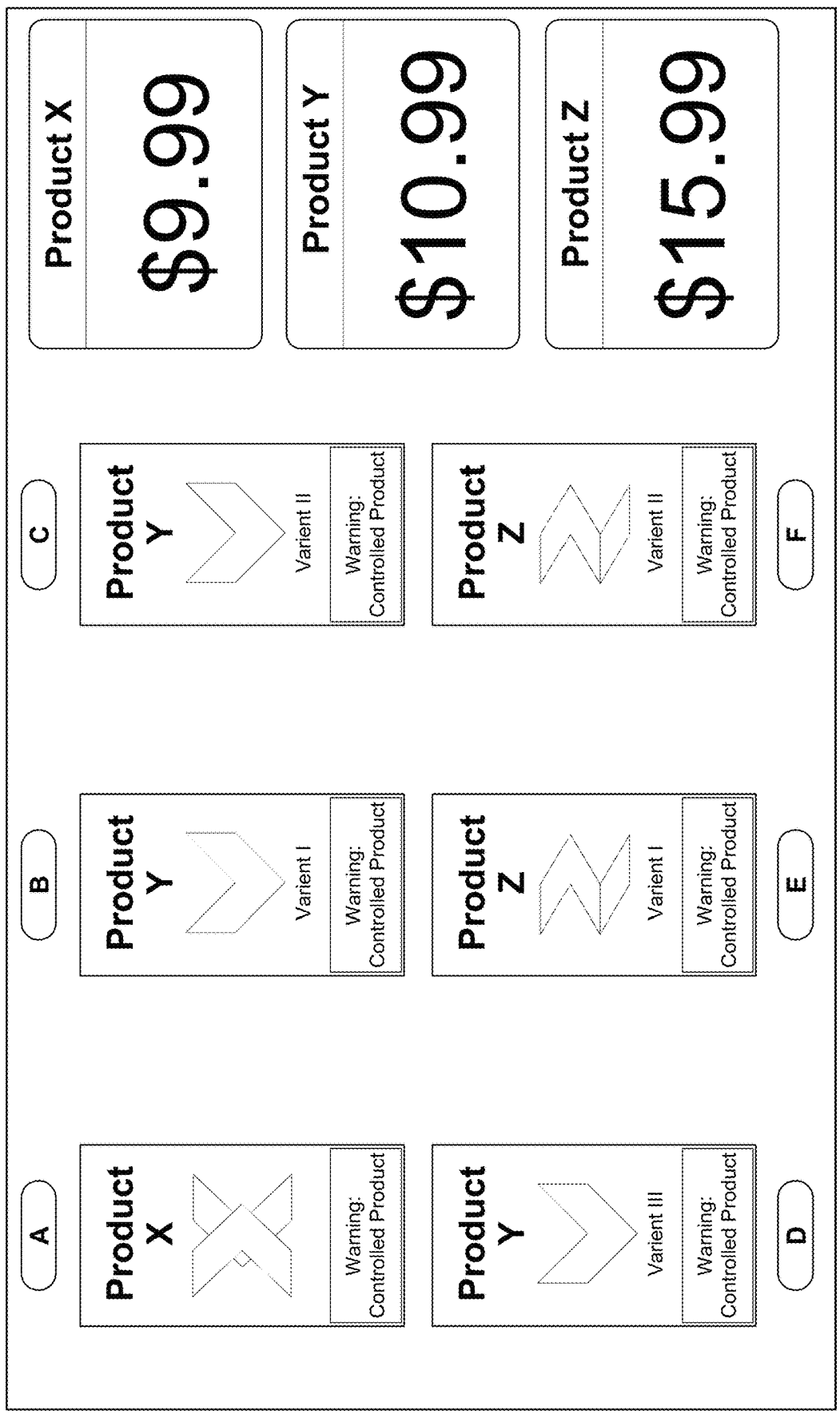
FIG. 15 is a diagram of an idle screen of a user interface in accordance with some implementations.

FIG. 15 depicts an idle screen with product images (Product X, Product Y, Product Z) and corresponding labels (A-F). The product images and labels may be selectable affordances, the selection of which identifies a product as described in operation 1402. The labels aid in identification of a desired product by a consumer to a clerk, and the product images may be animated. The idle screen also includes pricing, which can be changed locally on the dispensing machine 1302 or retailer machine 1312, or remotely at the server system 1308. There may be several different product variants (e.g., flavors of a vaping product or colors of spray paint) for a given product.

Figure 16A:
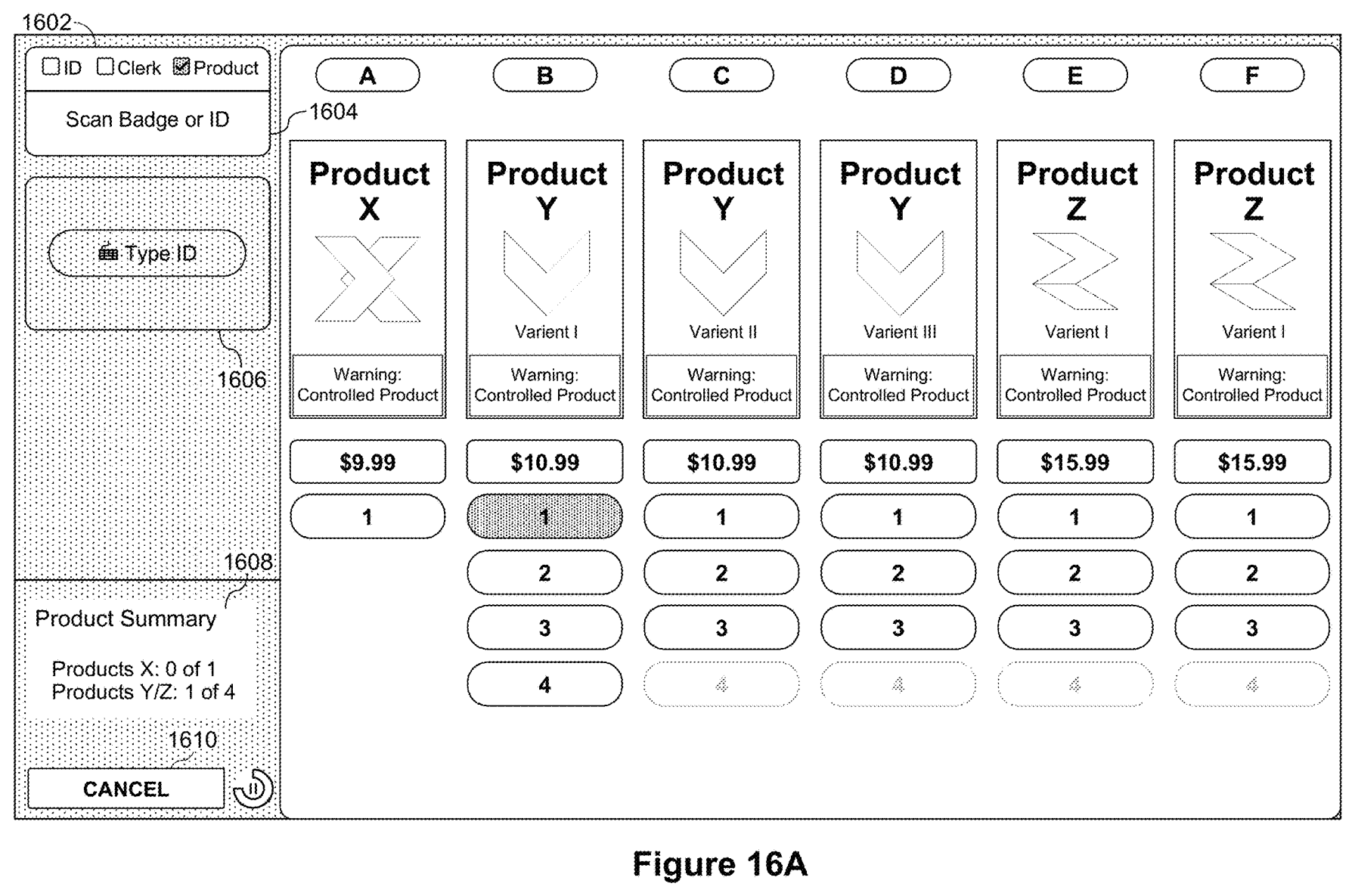

Upon selecting a product in the idle screen, the user interface advances to a transaction screen, as depicted in FIG. 16A. For example, upon selecting Product Y Variant I in the idle screen (FIG. 15), a quantity affordance "1" is highlighted, showing one Product Y Variant I has been selected (FIG. 16A). The transaction screen includes an array of quantity affordances (e.g., numbers 1, 2, 3, and 4 for each product), product images, letters, and prices. Each of the aforementioned elements may be selectable. Each product is associated with a plurality of quantity affordances representing different quantities of a corresponding product.

In some implementations, each of the quantity affordances may indicate a selection status based on whether it has been selected or not. For example, a quantity affordance that has been selected may be displayed with a highlight or a texture (e.g., the 1 affordance for Product B). In some implementations, selecting a quantity affordance that has already been selected causes the quantity affordance to be unselected, and for the quantity of selected products to be adjusted accordingly.

In some implementations, each of the quantity affordances may indicate an availability status based on (i) quantity limits for a corresponding product or quantity limits for the transaction, and (ii) a number of products already selected. If selection of a particular quantity affordance would cause the number of selected products to be greater than a relevant product limit or the transaction limit, then that particular affordance may indicate its unavailability (e.g., by being grayed out) and be non-selectable (e.g., the 4 affordances for Products C-F). Such an indication is referred to herein as an availability indication.

In some implementations, the availability status of the quantity affordances updates in real-time to indicate which quantity affordances may still be selected, as described above. FIGS. 16A-16F illustrate an example of real-time quantity affordance updates. In this example, there is a quantity limit (also referred to herein as a bulk limit) of one for Product X, and a combined product limit of four for Products Y and Z. As such, only one Product X may be selected and up to four Products Y and/or Z may be selected for a single dispensing transaction.

In FIG. 16A, one Product Y is selected. As such, all quantity affordances that would cause the number of selected Products Y and Z to be greater than four (the quantity limit) are grayed out. In this case, the 4 quantity affordances are grayed out for the other Products Y and Z. The 4 is not grayed out for the selected product, because selection of this 4 would cause the selected 1 to be unselected, and the new total selected quantity would be four, which meets the quantity limit.

Figure 16B:
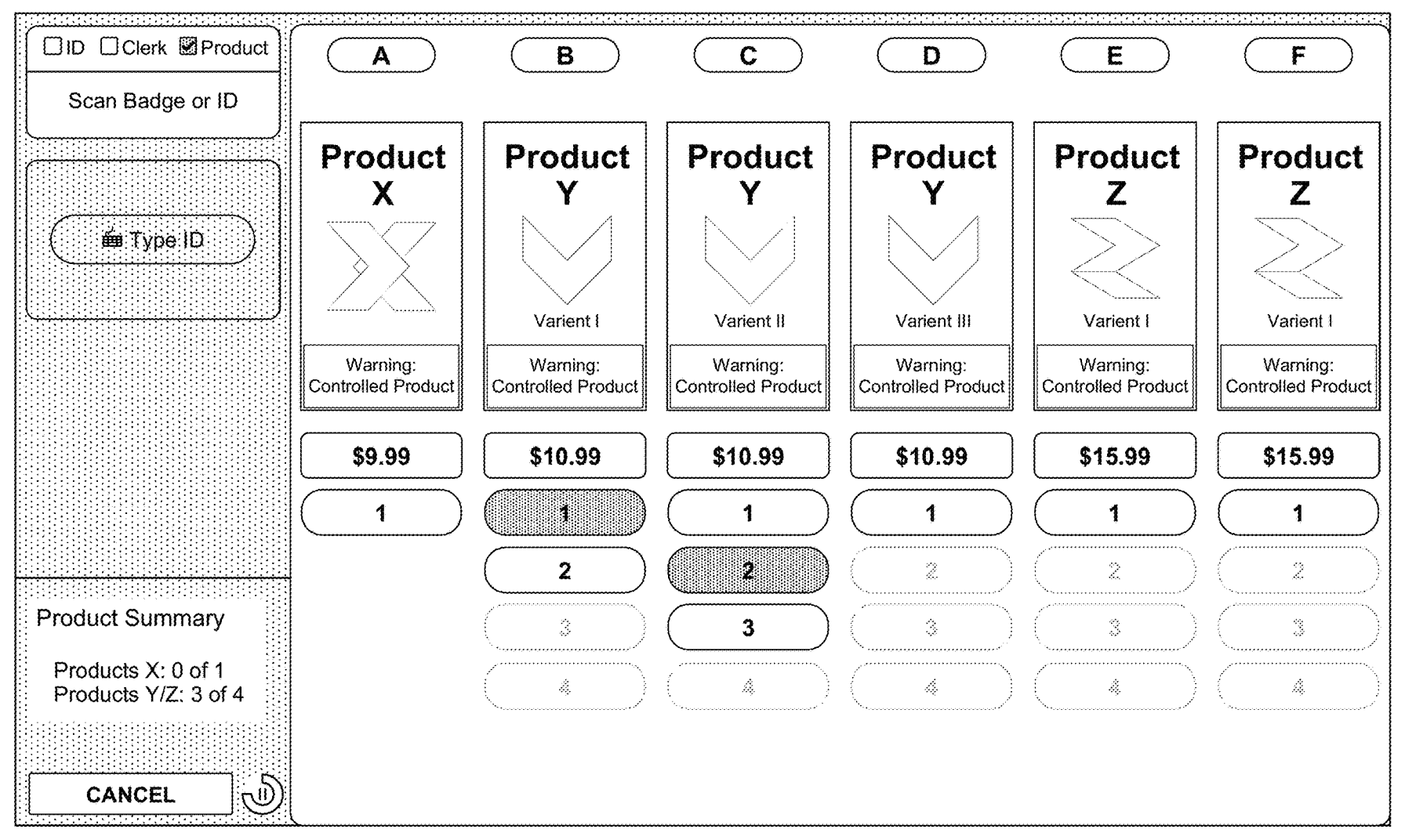

In FIG. 16B, two more Product Ys are selected, bringing the total of selected Products Y/Z to three. As such, additional quantity affordances are grayed.

Figure 16C:
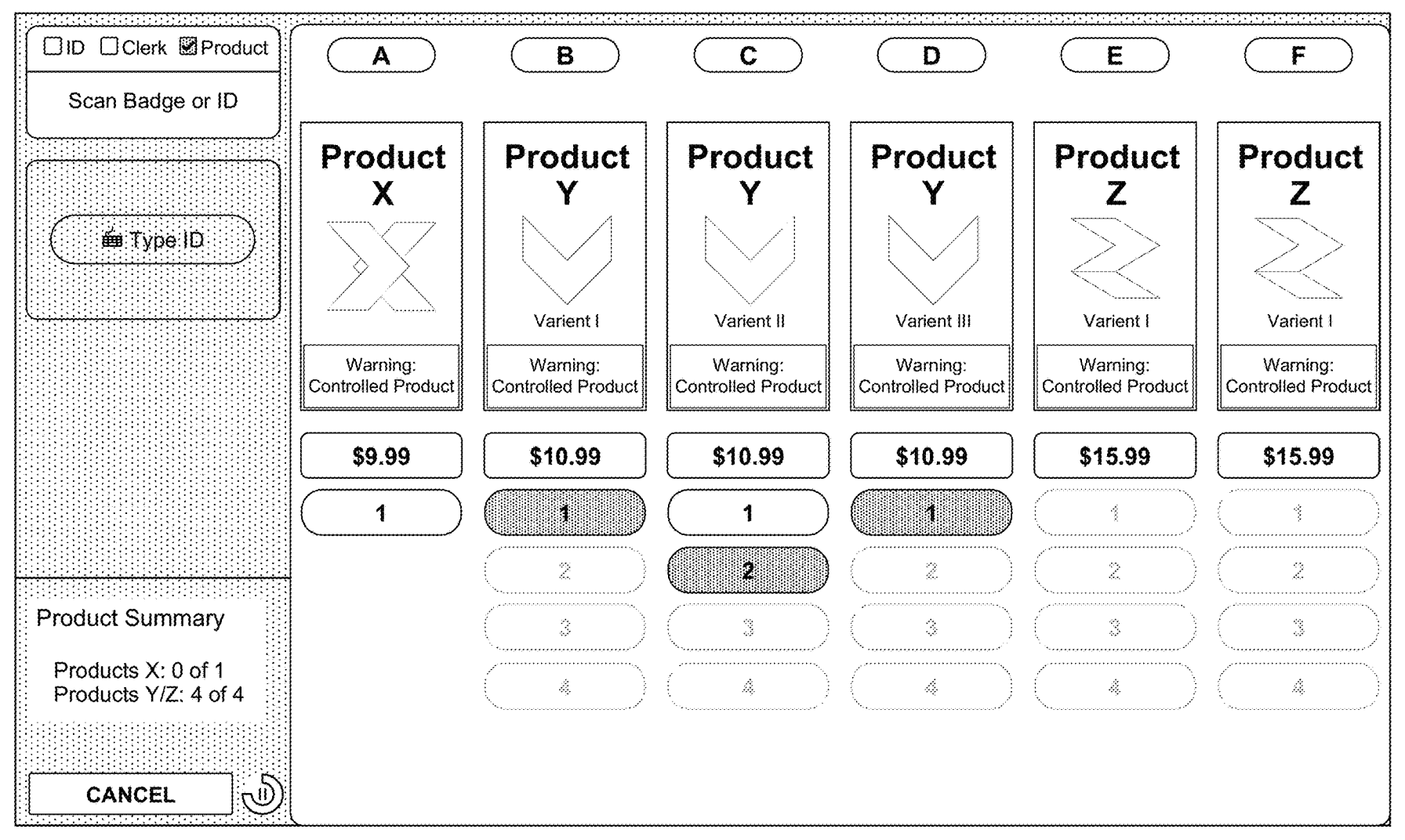

In FIG. 16C, one more Product Y is selected, bringing the total of selected Products Y/Z to four, which is the quantity limit. As such, all other quantity affordances for the other Products Y/Z are grayed out, except for the 1 affordance of Product Y Variant II, since selection of this affordance would deselect the 2 affordance, brining the total of selected Products Y/Z back down to three.

Figure 16D:
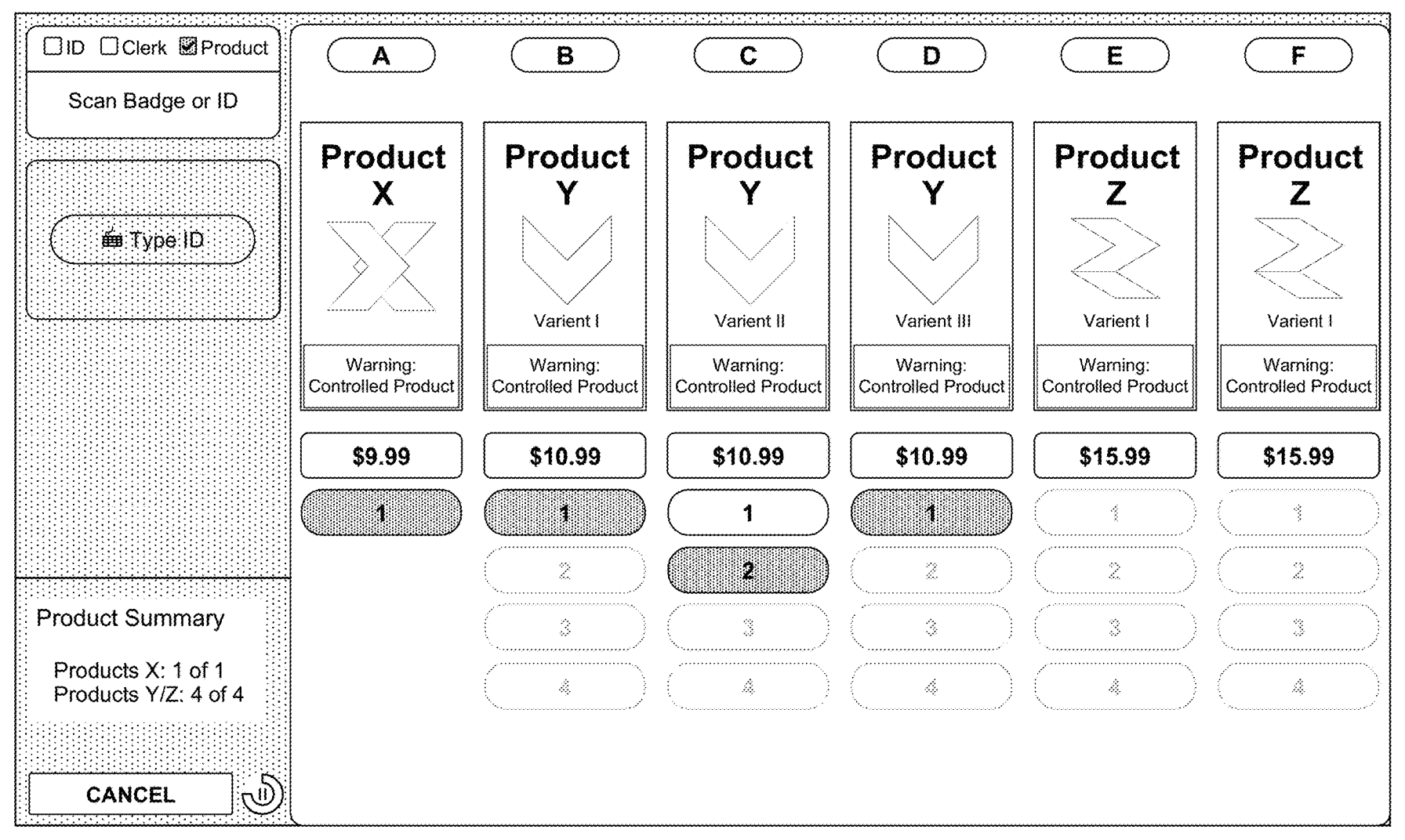

In FIG. 16D, one Product X is selected, thereby meeting the quantity limit for Product X.

Figure 16E:
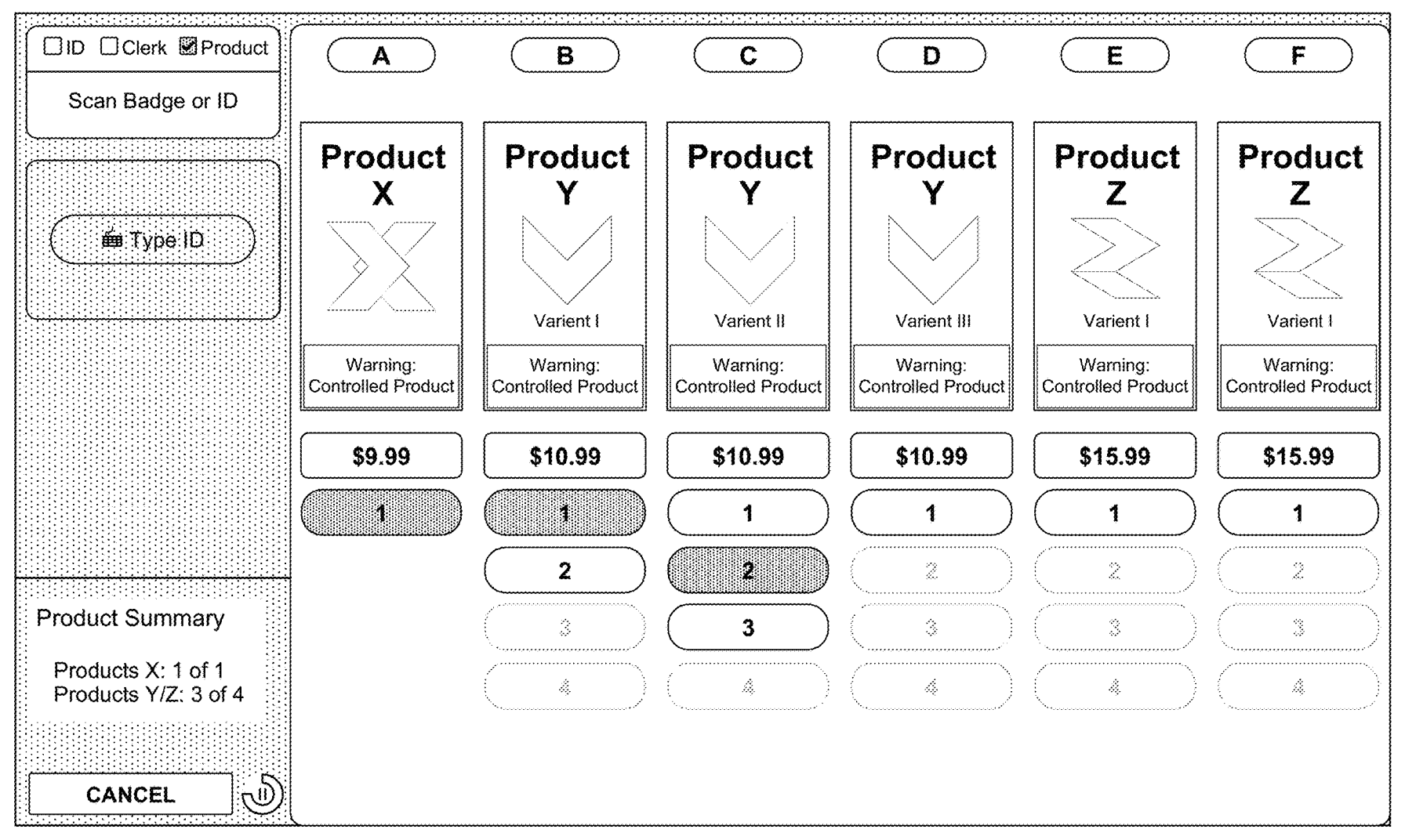

In FIG. 16E, one Product Y Variant III is deselected, bringing the total of selected Products Y/Z back down to three, which causes additional quantity affordances to indicate selectability.

Figure 16F:
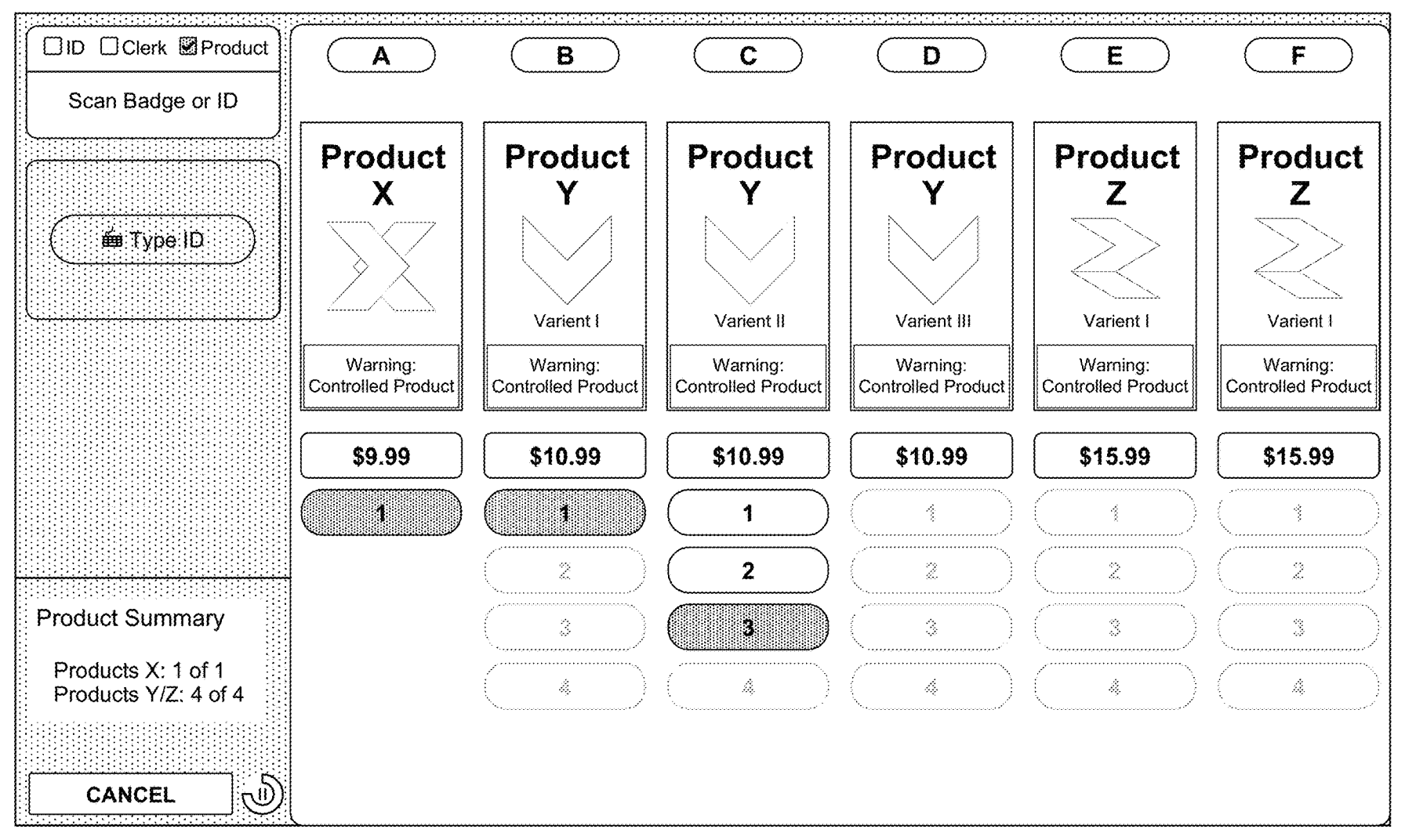

In FIG. 16F, the 3 affordance for Product Y Variant II has been selected, causing the 2 affordance for that product to be deselected, and causing the total of selected Products Y/Z to go back to four, which is the quantity limit. As a result of the total of selected Products Y/Z reaching the quantity limit of four, the quantity affordances associated with the other products are grayed out to indicate that they are unselectable.

Returning to FIG. 16A, the transaction screen may include a status section 1602, which includes status elements (e.g., ID, Clerk, and Product checkboxes) showing completion status of operations required for dispensing (e.g., operations 1402, 1404, and 1406). As each operation is completed, the corresponding status element updates to show completion of that operation (e.g., the box becomes checked).

The transaction screen may include an instruction box 1604, including instructions conveying to a clerk which operation(s) are still incomplete. Regardless of which instruction(s) are displayed, however, the operations may be completed in any order, as described above. Guidance provided by the instruction box 1604 enables a clerk with no training to complete the controlled dispensing method 1400.

The transaction screen may include an identification (ID) section 1606, including information about a scanned or manually entered (typed) consumer ID. A manual entry affordance ("Type ID") allows a clerk to manually enter information from the consumer's ID (e.g., date of birth, expiration date, license number, etc.). Alternatively, the clerk may scan the consumer's ID using the storage controller 124 as described above. Regardless of the method of entry, the ID section may be updated to show information associated with the consumer's ID (see FIG. 18). There may be a "verified by" message in proximity to the ID section (see FIG. 18), which conveys to the clerk that the clerk is being held accountable to physically verify the photo on the consumer's ID with the information being scanned. The "verified by" line may include the clerk's name or other identifying information obtained in operation 1404.

The transaction screen may include a product summary section 1608, including quantity limits and the number of selected products associated with each quantity limit as described above. The transaction screen may include a cancel affordance 1610, the selection of which ends the dispensing session. A pause affordance may be displayed in proximity to the cancel affordance, the selection of which extends the dispensing session (e.g., in the event the clerk gets a phone call or other distraction). The transaction screen may include a dispense affordance 1612 (see FIG. 18). The dispense affordance appears only after each required operation (e.g., 1402, 1404, and 1406) is completed (e.g., one or more products are selected, the consumer is of valid age, has a valid ID, the clerk has logged in, and the selected products are within limits). Selection of the dispense affordance causes the dispensing machine 1302 to dispense the selected products (e.g., causes the processing circuitry 1316 to send an instruction to a dispensing mechanism associated with each selected product to dispense a specified quantity of each respective product).

Figure 17A:
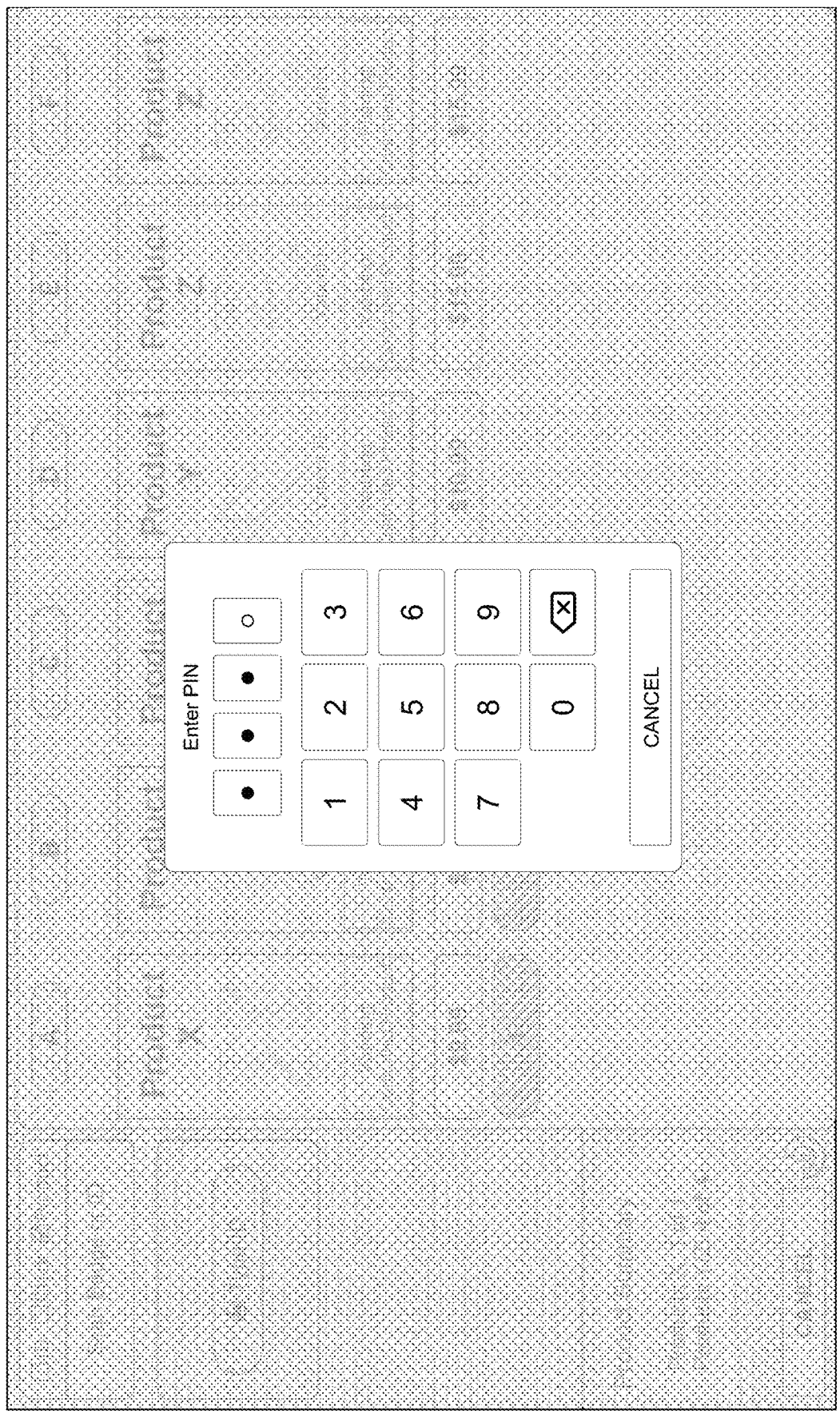
Figure 17B:
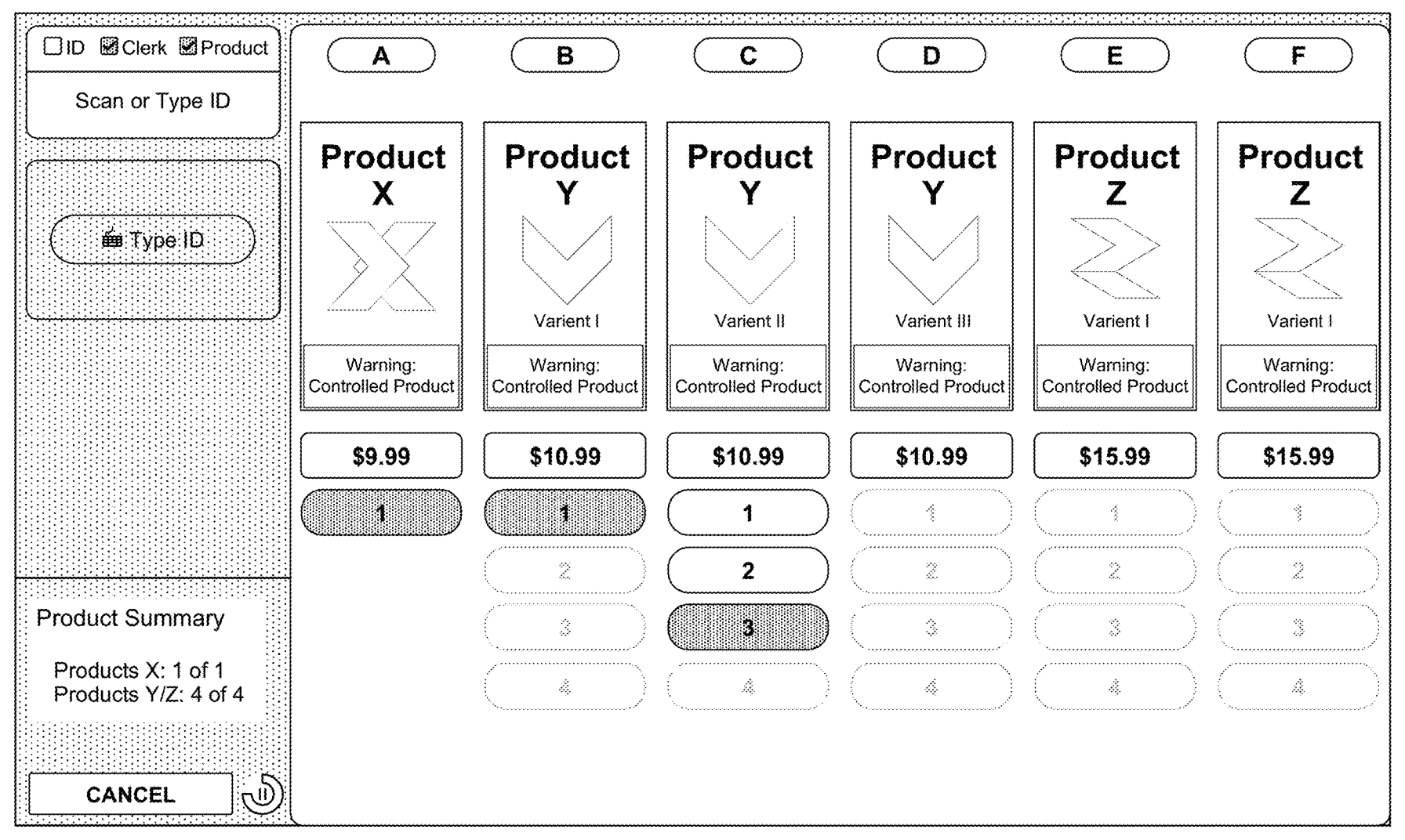
Figure 18:
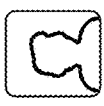
FIG. 18 is a diagram of a transaction screen of a user interface associated with consumer validation in accordance with some implementations.

Returning to FIG. 16F, five products have been selected—one Product X (meeting the quantity limit of such products), and four Products Y/Z (meeting the quantity limit of such products). At this point in the dispensing process, quantity affordances may be deselected or alternative quantity affordance may be selected in order to change the quantity and type of desired products for dispensing. As long as at least one product is selected, the product status element of the status section 1602 is checked. At this point (or prior to product selection, or subsequent to consumer validation, as described above), the clerk may scan a badge or access card using the storage controller 124, as described above with reference to operation 1404. As part of this operation, the user interface may display a PIN entry screen (FIG. 17A). Once the clerk's PIN is entered (or if no PIN is required, once the clerk's badge is scanned), the status section 1602 of the user interface conveys completion of the clerk authorization operation 1404 (e.g., the clerk element is checked, see FIG. 17B). At this point in the dispense operation (or prior to the clerk authorization operation and/or the product selection operation, as described above), the consumer's ID may be scanned using the storage controller 124 or manually entered. The ID section 1606 may display confirmation of a valid ID (FIG. 18), or an "Invalid ID" message if the ID is expired or otherwise found to be invalid, or an "Underage" message if the consumer's age does not meet an age threshold for a selected product. Upon a successful scanning or entry of a valid consumer ID, the status section 1602 conveys completion of the consumer validation operation (e.g., the ID box is checked). Once all three operations 1402, 1404, and 1404 are completed (or a subset of those operations depending on which operations are required), the dispense affordance 1612 is displayed, the selection of which causes the selected products to be dispensed.

Figure 19:
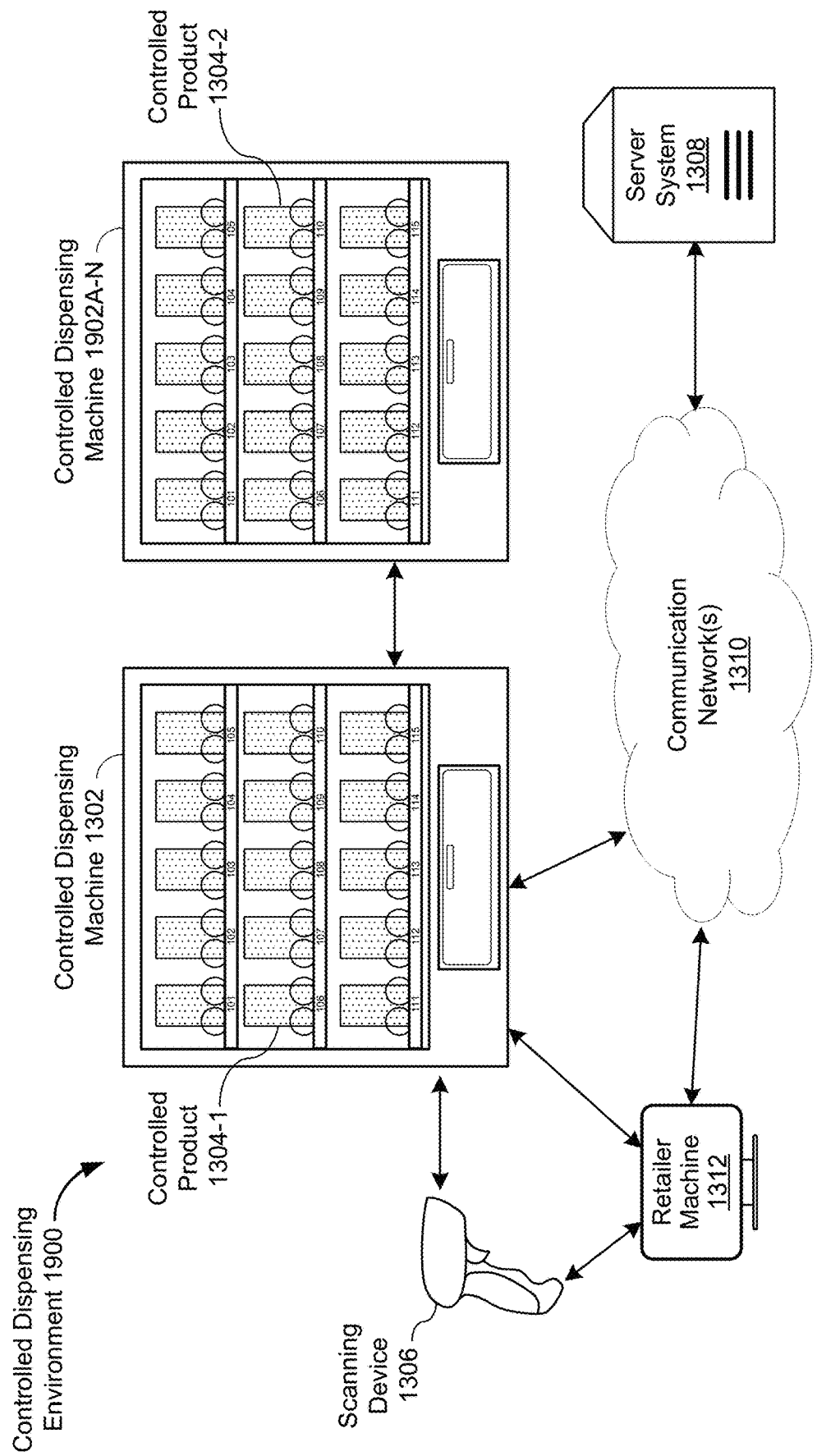
FIG. 19 is a diagram of a controlled dispensing environment in accordance with some implementations.

FIG. 19 is a diagram of a controlled dispensing environment 1900. Items corresponding with those in the controlled dispensing environment 1300 (FIG. 13) are similarly numbered and some are not further discussed for purposes of brevity. In the controlled dispensing environment 1900, a plurality of secondary dispensing machines 1902A-N may be communicatively coupled to a master dispensing machine 1302. The interconnected dispensing machines may communicate with a single controller, or more specifically, a single instance of the processing circuitry 1316. The interconnected dispensing machines may be further coupled to a single scanning device 1306 and/or a single retailer machine 1312. For example, a scanned product identifier (e.g., barcode) may be conveyed to the processing circuitry 1316 of the dispensing machine 1302 or the retailer machine 1312, and the processing circuitry 1316 determines which dispensing machine houses the desired controlled product 1304. The dispensing machine that includes the desired product is the one that receives "dispense" instructions from the processing circuitry 1316 upon successful completion of required dispensing operations (e.g., 1402, 1404, and/or 1406). In some implementations, the processing circuitry 1316 may convey a message on the display screen 1314 of the dispensing machine 1302 or the retailer machine 1312, instructing a clerk to proceed to a particular dispensing machine to retrieve a dispensed product. In some implementations, a routing table is included in memory of the processing circuitry 1316 that routes respective controlled products 1304 to respective dispensing machines (1302 or 1902A-N) in which they are housed. The dispensing machines 1302 and 1902A-N may be communicatively coupled via a wired or wireless local area network as described above, or over a wide area network (e.g., via communication network(s) 1310 and the server system 1308 as described above). As such, a plurality of dispensing machines may be employed in the controlled dispensing environment 1900 without the requirement for separate scanning devices for each dispensing machine, and confusion regarding which dispensing machine from which to retrieve a dispensed product may be avoided.

Miscellaneous

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. A controlled dispensing system comprising:
   a vending machine having or in communication with a retailer display screen;
   a scanning device;
   one or more processors and memory storing one or more programs to be executed by the one or more processors, the one or more programs including instructions for:
      obtaining via the scanning device one or more identifiers of one or more respective controlled products requested for dispensing by the vending machine;
      updating a user interface on the retailer display screen to show a first indication of the obtained one or more identifiers;
      obtaining via the scanning device consumer identification information;
      determining that the consumer identification information meets an age threshold and/or an identity requirement associated with the one or more controlled products;
      while showing the first indication of the obtained one or more identifiers on the retailer display screen, updating the user interface on the retailer display screen to show a second indication that the consumer identification information meets the age threshold and/or the identity requirement associated with the one or more controlled products;
      in accordance with the updating of the user interface on the retailer display screen to show both the first indication and the second indication, updating the user interface on the retailer display screen to cause a dispense affordance to become selectable, wherein the dispense affordance becoming selectable is conditioned on the first indication and the second indication being shown on the retailer display screen;
      detecting selection of the dispense affordance; and
      in accordance with the detected selection of the dispense affordance, transmitting a dispensing instruction to the vending machine to dispense the one or more controlled products.

2. The controlled dispensing system of claim 1, wherein the one or more programs further include instructions for:
   obtaining clerk authentication information from a badge scan, an access card scan, or a personal identification number (PIN) entry for validating dispensing of the one or more controlled products; and
   determining validity of the clerk authentication information; and
   updating the user interface on the retailer display screen to show a third indication that the clerk authentication information is valid.

3. The controlled dispensing system of claim 2, wherein:
   updating the user interface on the retailer display screen to cause the dispense affordance to become selectable is further in accordance with the updating of the user interface on the retailer display screen to show the third indication.

4. The controlled dispensing system of claim 1, wherein the one or more programs further include instructions for:
   evaluating a risk threshold based on a health risk score associated with the consumer;
   wherein updating the user interface on the retailer display screen to cause the dispense affordance to become selectable is further in accordance with the risk threshold evaluation.

5. The controlled dispensing system of claim 1, wherein:
   updating the user interface on the retailer display screen to show the first indication includes indicating selection of a first box associated with a product selection step; and
   updating the user interface on the retailer display screen to show the second indication includes indicating selection of second box associated with a consumer identification step.

6. The controlled dispensing system of claim 1, wherein the retailer display screen is integrated into the vending machine.

7. The controlled dispensing system of claim 1, wherein the retailer display screen is included in a point-of-sale device communicatively coupled to the vending machine.

8. The controlled dispensing system of claim 1, wherein the retailer display screen is included in, or communicatively coupled to, a retailer machine configured to provide dispensing instructions to the vending machine.

9. The controlled dispensing system of claim 1, wherein the scanning device is integrated into the vending machine.

10. The controlled dispensing system of claim 1, wherein the scanning device is a handheld scanner paired to the vending machine using a wired or wireless communication link.

11. A method, comprising:
   at a controlled dispensing system including a vending machine having or in communication with a retailer display screen, a scanning device communicatively coupled to the vending machine, and one or more processors and memory:
      obtaining via the scanning device one or more identifiers of one or more respective controlled products requested for dispensing by the vending machine;
      updating a user interface on the retailer display screen to show a first indication of the obtained one or more identifiers;

obtaining via the scanning device consumer identification information;

determining that the consumer identification information meets an age threshold and/or an identity requirement associated with the one or more controlled products;

while showing the first indication of the obtained one or more identifiers on the retailer display screen, updating the user interface on the retailer display screen to show a second indication that the consumer identification information meets the age threshold and/or the identity requirement associated with the one or more controlled products;

in accordance with the updating of the user interface on the retailer display screen to show both the first indication and the second indication, updating the user interface on the retailer display screen to cause a dispense affordance to become selectable, wherein the dispense affordance becoming selectable is conditioned on the first indication and the second indication being shown on the retailer display screen;

detecting selection of the dispense affordance; and in accordance with the detected selection of the dispense affordance, transmitting a dispensing instruction to the vending machine to dispense the one or more controlled products.

12. The method of claim 11, further comprising:

obtaining clerk authentication information from a badge scan, an access card scan, or a personal identification number (PIN) entry for validating dispensing of the one or more controlled products; and determining validity of the clerk authentication information; and updating the user interface on the retailer display screen to show a third indication that the clerk authentication information is valid.

13. The method of claim 12, wherein:

updating the user interface on the retailer display screen to cause the dispense affordance to become selectable is further in accordance with the updating of the user interface on the retailer display screen to show the third indication.

14. The method of claim 11, further comprising:

evaluating a risk threshold based on a health risk score associated with the consumer;

wherein updating the user interface on the retailer display screen to cause the dispense affordance to become selectable is further in accordance with the risk threshold evaluation.

15. The method of claim 11, wherein:

updating the user interface on the retailer display screen to show the first indication includes indicating selection of a first box associated with a product selection step; and updating the user interface on the retailer display screen to show the second indication includes indicating selection of second box associated with a consumer identification step.

16. A non-transitory computer readable storage medium storing one or more programs configured for execution by a controlled dispensing system, the one or more programs including instructions for:

obtaining via a scanning device of the controlled dispensing system one or more identifiers of one or more respective controlled products requested for dispensing by a vending machine of the controlled dispensing system;

updating a user interface on the retailer display screen to show a first indication of the obtained one or more identifiers;

obtaining via the scanning device consumer identification information;

determining that the consumer identification information meets an age threshold and/or an identity requirement associated with the one or more controlled products;

while showing the first indication of the obtained one or more identifiers on the retailer display screen, updating the user interface on the retailer display screen to show a second indication that the consumer identification information meets the age threshold and/or the identity requirement associated with the one or more controlled products;

in accordance with the updating of the user interface on the retailer display screen to show both the first indication and the second indication, updating the user interface on the retailer display screen to cause a dispense affordance to become selectable, wherein the dispense affordance becoming selectable is conditioned on the first indication and the second indication being shown on the retailer display screen;

detecting selection of the dispense affordance; and in accordance with the detected selection of the dispense affordance, transmitting a dispensing instruction to the vending machine to dispense the one or more controlled products.

17. The non-transitory computer readable storage medium of claim 16, wherein the one or more programs further include instructions for:

obtaining clerk authentication information from a badge scan, an access card scan, or a personal identification number (PIN) entry for validating dispensing of the one or more controlled products; and determining validity of the clerk authentication information; and updating the user interface on the retailer display screen to show a third indication that the clerk authentication information is valid.

18. The non-transitory computer readable storage medium of claim 17, wherein:

updating the user interface on the retailer display screen to cause the dispense affordance to become selectable is further in accordance with the updating of the user interface on the retailer display screen to show the third indication.

19. The non-transitory computer readable storage medium of claim 16, wherein the one or more programs further include instructions for:

evaluating a risk threshold based on a health risk score associated with the consumer;

wherein updating the user interface on the retailer display screen to cause the dispense affordance to become selectable is further in accordance with the risk threshold evaluation.

20. The non-transitory computer readable storage medium of claim 16, wherein:

updating the user interface on the retailer display screen to show the first indication includes indicating selection of a first box associated with a product selection step; and updating the user interface on the retailer display screen to show the second indication includes indicating selection of second box associated with a consumer identification step.

* * * * *